(12) United States Patent
Hsu

(10) Patent No.: US 7,671,928 B2
(45) Date of Patent: Mar. 2, 2010

(54) DISPLAY APPARATUS INCLUDING SELF-LUMINESCENT DEVICE AND NON-SELF-LUMINESCENT DEVICE

(75) Inventor: Jui-Hsi Hsu, Tainan (TW)

(73) Assignee: Hsin-Chun Chiang, Hsin Chu (TW)

( * ) Notice: Subject to any disclaimer, the term of this patent is extended or adjusted under 35 U.S.C. 154(b) by 445 days.

(21) Appl. No.: 11/580,987

(22) Filed: Oct. 16, 2006

(65) Prior Publication Data

US 2007/0085484 A1    Apr. 19, 2007

(30) Foreign Application Priority Data

Oct. 17, 2005    (TW)    .............................. 94136101 A

(51) Int. Cl.
*G02F 1/135*    (2006.01)
(52) U.S. Cl. ....................................................... 349/25
(58) Field of Classification Search ........................ None
See application file for complete search history.

(56) References Cited

U.S. PATENT DOCUMENTS

2006/0072047 A1*    4/2006    Sekiguchi ..................... 349/25

* cited by examiner

*Primary Examiner*—Sung H Pak
(74) *Attorney, Agent, or Firm*—Muncy, Geissler, Olds & Lowe, PLLC

(57) ABSTRACT

A display apparatus with a self-luminescent device and a non-self-luminescent device has a first substrate, a second substrate, and a pixel matrix with a plurality of pixels. Each pixel has a first switching device, a non-self-luminescent device controlled by the first switching device, a second switching device, and a self-luminescent device controlled by the second switching device. The first switching device and the second switching device are active devices, wherein the first switching device is disposed on the first substrate, and the second switching device is disposed on the second substrate. Alternatively, one of the first switching device and the second switching device is a passive device. Also, the first switching device is on the first substrate, and the second switching device is on the second substrate. An apparatus for controlling the disclosed display apparatus is also disclosed.

54 Claims, 22 Drawing Sheets

DISPLAY APPARATUS INCLUDING SELF-LUMINESCENT DEVICE AND NON-SELF-LUMINESCENT DEVICE

BACKGROUND OF THE INVENTION

1. Field of the Invention

The present invention relates to a display apparatus, and in particular, to a display apparatus including a self-luminescent device and a non-self-luminescent device.

2. Brief Description of the Prior Art

Digital electronic apparatus such as mobile phones, PDAs, and notebook computers have become necessary equipment as today's technology continues to advance. The capability of said digital electronic apparatus for storing power is relatively low, however, the display apparatus typically utilized in conjunction with such digital electronic apparatus tends to have a low power consumption as well. Additionally, because the digital electronic apparatus includes more and more functions, the display apparatus should be capable of displaying full color high resolution images and movies.

Normally, the display apparatus can be classified into one of two categories, these are a self-luminescent device or a non-self-luminescent device. Furthermore, the liquid crystal display (LCD) apparatus, which is of the non-self-luminous device category is classified into transmissive, reflective or transflective types.

The transmissive type LCD produces superior image quality when utilized in environments having average ambient light, however, the transmissive type LCD does not produce sufficient brightness under sunlight conditions. Additionally, the transmissive type LCD requires a back light unit which significantly increases it's power consumption.

The reflective type LCD can utilize surrounding light (i.e., ambient light) and also has good visibility when utilized in sunlight conditions. However, the reflective type LCD requires a front light unit to provide sufficient brightness during conditions when the surrounding light itself is insufficient. Additionally, the uniformity of the front light unit is poor thus the image quality of the reflective type LCD is reduced.

The transreflective type LCD includes both transmissive and reflective regions, thus the transmissive region can be utilized when the surrounding light is insufficient for producing a quality display image and the reflective region can be utilized when the transflective type LCD is utilized in a sunlight environment. Since the pixel size is fixed, the reflective region decreases while the transmissive region increases, and vice versa. Luminance of the plate maybe insufficient if the transmissive region is not enough, and the display apparatus may has poor displaying quality under sunlight if the reflective region is not enough.

The organic EL (Electro-Luminescence) is a display apparatus with high efficiency and less power consumption than the alternative types mentioned heretofore. However, the organic EL is a self-luminescent device and therefore has poor visibility under sunlight conditions similar to the transmissive type LCD previously discussed. The efficiency of the organic EL and the expected lifespan of the organic EL will decrease rapidly when brightness is increased to overcome sunlight conditions thereby helping the organic EL to be visible under sunlight.

To retain the advantages while avoiding the disadvantages of the display apparatus mentioned earlier, the display apparatus including a self-luminescent device and a non-self-luminance device is proposed, as shown in patents and patent applications U.S. Pat. No. 6,714,268, U.S. Pat. No. 6,912, 021, U.S. Pat. No. 6,954,239, US20030052869, US20030103021, US20030201960, US20040125271, and WO2004053819. However, the inventions disclosed in these documents still have the disadvantage that the design and process of manufacturing is complicated because the control devices for each of the two display apparatus are provided on a same single substrate. The design of the circuit is difficult if a single switching device is used for controlling two different display apparatus.

Therefore, it is apparent that a new invention must be proposed to resolve the disadvantages cited above.

SUMMARY OF THE INVENTION

One objective of the present invention is to provide a display apparatus with a self-luminescent device and a non-self-luminescent device.

Another objective of the present invention is to provide an apparatus for controlling the operation of active matrixes of the display apparatus according to the preferred embodiment of the present invention.

The present invention discloses a display apparatus with a self-luminescent device and a non-self-luminescent device that comprises a first substrate; a second substrate; and a pixel matrix with a plurality of pixels. Each of the pixels comprise: a first switching device; a non-self-luminescent device, controlled by the first switching device; a second switching device; and a self-luminescent device, controlled by the second switching device. The first switching device and the second switching device are active devices, wherein the first switching device is on the first substrate, and the second switching device is on the second substrate. Alternatively, one of the first switching device and the second switching device is a passive device and the first switching device is on the first substrate, and the second switching device is on the second substrate.

The present invention also discloses an apparatus for controlling the operation of active matrixes, which comprises a first substrate and a second substrate. The first substrate comprises a signal receiving region; a first active matrix, comprising scan lines coupled to the data receiving region; a first connection line region, coupled to the data lines and the signal receiving region; a second connection line region, coupled to the signal receiving region. The second substrate, comprises a second active matrix with data lines protruding from the second active matrix. The protruding portion of the data lines of the second active matrix is coupled to the second connection line region, and the scan lines of the second active matrix are coupled to the signal receiving region.

The present invention further discloses an apparatus for controlling active matrix and passive matrix, and the apparatus comprises a first substrate and a second substrate. The first substrate comprises an active matrix with at least one scan line and at least one data line; at least one first electrode bar, covering the scan lines and the data lines; a first connection line region, coupled to the data lines; a second connection line region and a signal receiving region, coupled to the scan lines, the first connection line region, the first electrode bar and the second connection line region. The second substrate comprises at least one second electrode bar, the second electrode bar is coupled to the second connection line region when the first substrate substantially overlaps the second substrate.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 7 (b) is a schematic diagram illustrating a substrate layout that can be applied to a display apparatus with two active matrixes.

DETAILED DESCRIPTION OF THE PREFERRED EMBODIMENTS

Figure 1A:
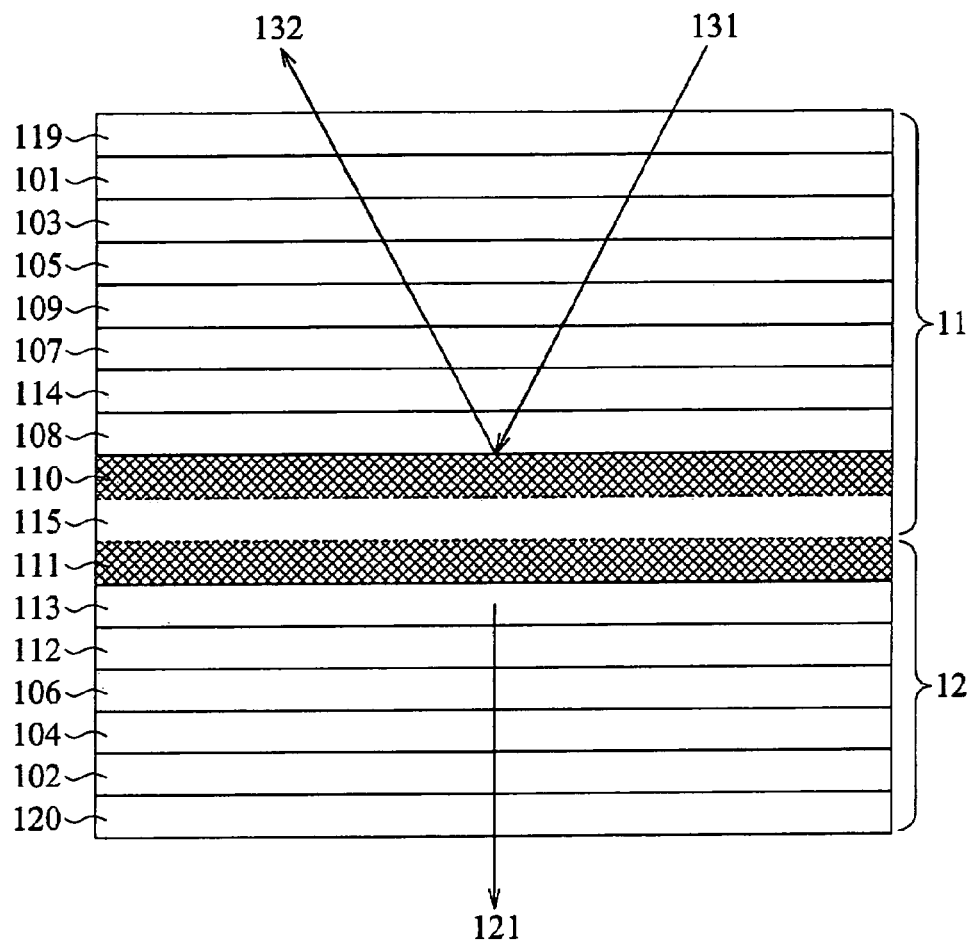
FIG. 1(a) is a schematic diagram illustrating a first embodiment according to a display apparatus of the present invention.

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The display apparatus according to the present invention is described hereinafter according to the various embodiments.

The present invention utilizes two active switching devices or an active switching device and a passive switching device to control a self-luminescent device and a non-self-luminescent device. In the preferred structure of the present invention, the self-luminescent device or the non-self-luminescent device are provided (i.e., disposed) between the electrodes, and the self-luminescent device or the non-self-luminescent device can utilize at least one electrode respectively or jointly utilize the electrode. The preferred embodiment is illustrated via figures described hereinafter, however, said figures are intended to offer descriptive matter and do not in any way intend to limit the scope and spirit of the present invention.

A display apparatus according to a first embodiment of the present invention will now be described with reference to FIG. 1(a) to FIG. 1(e). As shown in FIG. 1 (a) and FIG. 1(b), the display apparatus includes a non-self-luminescent display apparatus 11 and a self-luminescent display apparatus 12. The display apparatus includes two substrates 101 and 102, wherein a TFT layer 104 and an EL (electro luminescent) layer 113 are provided on the substrate 102 sequentially. The EL layer 113 is provided between a reflective electrode 111 and a transparent electrode 112 to form a bottom emissive EL device. Normally, the EL layer 113 comprises an electron transport layer, a hole transport layer, an electron injection layer, a hole injection layer, and an emitting layer. The EL layer 113 can emit white light or color light. If the white light EL is utilized but a color image is desired, there should be a filter layer 106 on the TFT layer 104 of the substrate 102. Please note that the filter layer 106 is unnecessary if the color EL is utilized. Furthermore, the filter layer 106 can be replaced by a color conversion layer (not shown).

The display apparatus functions as an EL display apparatus if it is observed from substrate 102 to substrate 101. Also, the electrical signal to the EL device is controlled by the TFT layer 104 to modulate the intensity of the self-luminescent light 121.

The display apparatus functions as a reflective type LCD if it is observed from the substrate 101 to the substrate 102. The environment light 131 goes through the liquid crystal layer 114 and is reflected by the reflective electrode 110. The reflective electrode 110 is constructed from materials having high reflectivity such as silver and aluminum. The substrate 101 includes a TFT layer 103. The TFT layer 103 functions as a switch for controlling the transparent electrode 109. The liquid crystal layer 114 can be controlled by the voltage difference between the transparent electrode 109 and the reflective electrode 110, thus the reflected light 132 can be adjustable. Moreover, the EL device and the liquid crystal device can be operated independently to achieve the maximum quality. To improve the display performance, the scattering layer 115 can be utilized. The scattering layer 115 can comprise photoresist with a concave surface or a convex surface, which is also called a reflective bump in the conventional reflective type LCD. Also, the same effect can be achieved by distributing tiny particles such as $SiO_x$, $TiO_2$, and MgO in the scattering layer 115. The filter layer 105 can be added thereby permitting the reflective type liquid crystal display apparatus to be able to display color images. The alignment layers 107 and 108 are used for controlling the liquid crystal molecule arrangement of the liquid crystal layer 114. More particularly, the arrangement of the liquid crystal can be homogeneous, homeotropic, twist or any other arrangements. Since the EL layer 113 is under the alignment layer 108, the preferred alignment layer 108 is a low temperature organic alignment layer formed below 150° C., or an inorganic layer such as $SiO_x$ or diamond-like carbon (DLC) film. These are preferred alignment layers because they help to avoid damaging the EL layer 113. Moreover, a protection layer can be provided to protect the EL device. The protection layer can be single-layer or multi-layer comprised of organic or inorganic material, such as photoresist, $SiO_x$, $SiN_x$, DLC, etc. Please refer to FIG. 1(a). In FIG. 1(a), for example, the protection layer can be provided between the reflective electrode 111 and the scattering layer 115. Alternatively, the protection layer can be omitted to decrease the manufacturing cost.

Figure 1B:
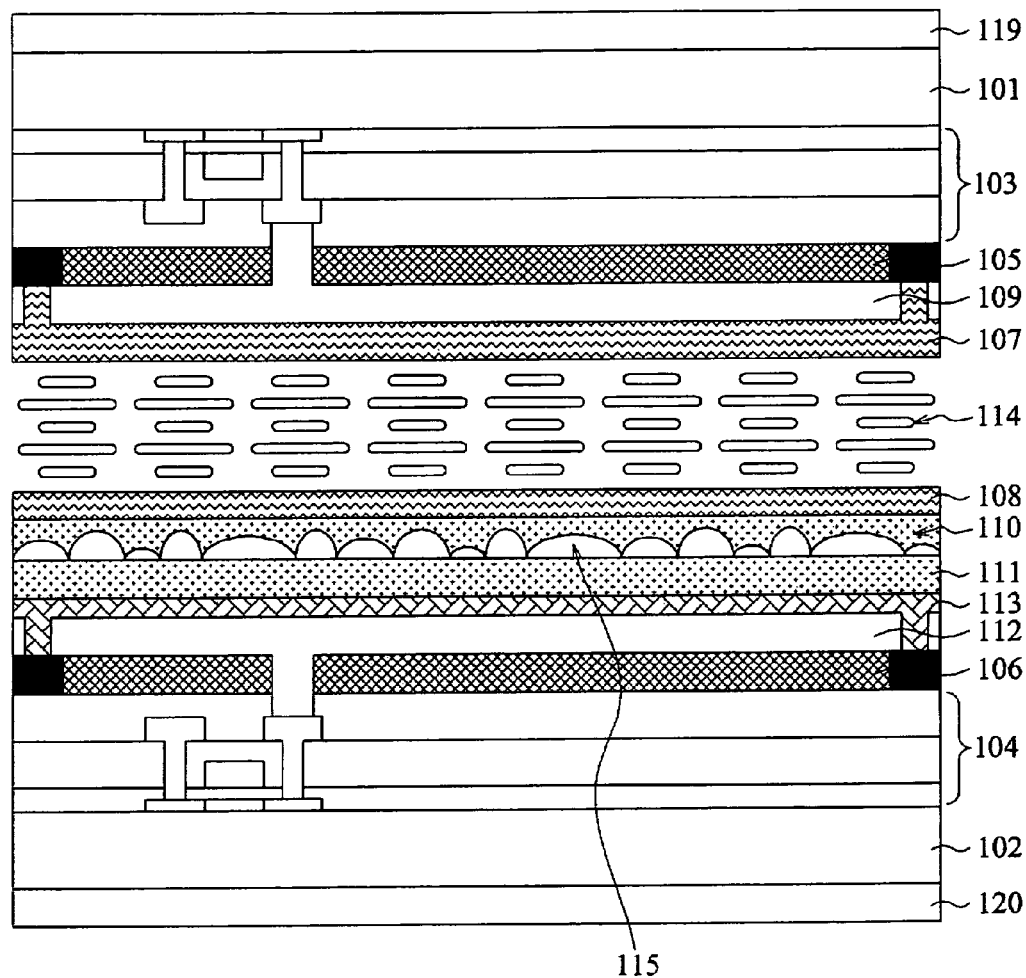
FIG. 1(b) is a cross-section diagram illustrating the first embodiment according to a display apparatus of the present invention.
Figure 1C:
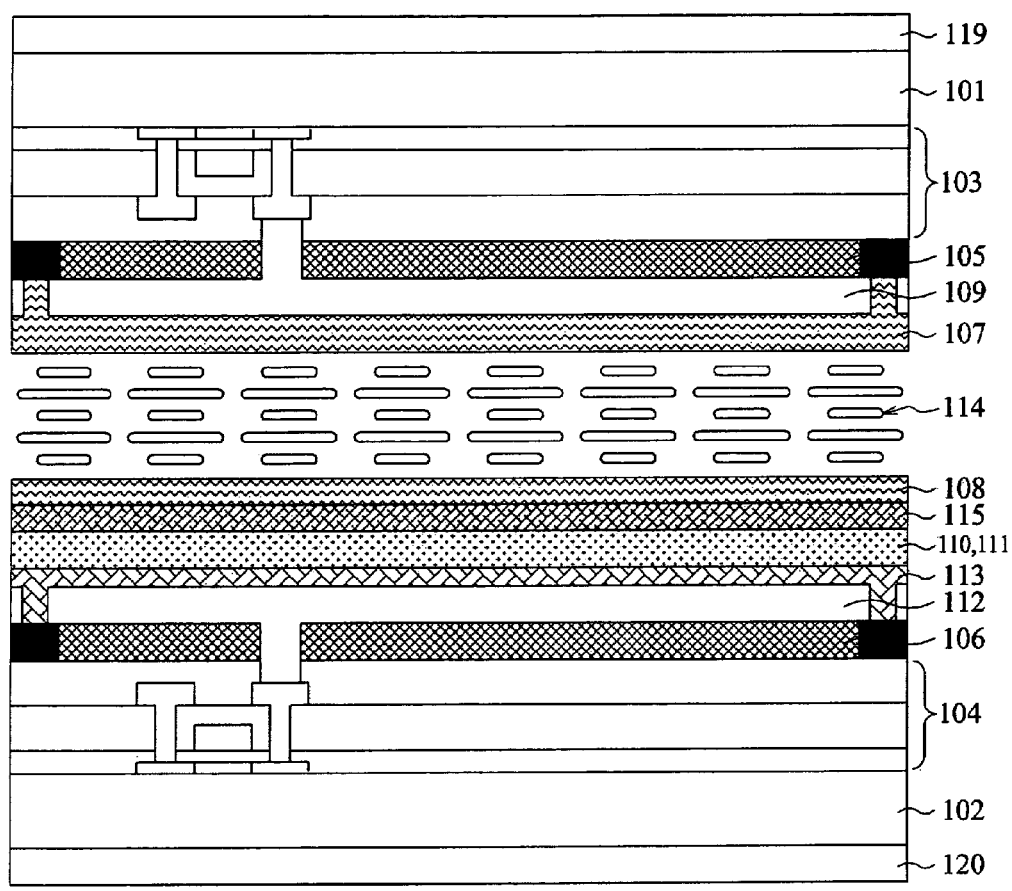
FIG. 1(c) is a cross-section diagram illustrating the first embodiment according to a display apparatus of the present invention.

In another preferred embodiment as shown in FIG. 1(c), the reflective electrodes 110 and 111 can be merged to make the non-self-luminescent (e.g., the reflective type liquid crystal) display apparatus and the self-luminescent (e.g., the EL) display apparatus jointly utilize the reflective electrodes 110 and 111. In this case, the scattering layer 115 can be moved above the reflective electrodes 110 and 111 to enhance the image quality. The scattering layer 115 can be omitted to reduce the manufacturing cost, but such a resulting structure may not produce the best image quality.

The manufacturing process of the display apparatus is similar with that of a conventional LCD and is described next in the following steps.

First, sequentially providing the TFT layer 103, the filter layer 105, the transparent electrode 109 and the alignment layer 107 above the substrate 101.

Second, sequentially providing the TFT layer 104, the filter layer 106, the transparent electrode 112, the EL layer 113, the reflective electrode 111, the scattering layer 115, the reflective electrode 110 and the alignment layer 108 above the substrate 102.

Third, choosing at least one of the substrate 101 or substrate 102 to dispense seal and spread spacers thereon, then assembling the substrates 101 and 102 and filling liquid crystal between the substrate 101 and 102 after they are assembled. Alternatively, the liquid crystal can be dropped before the substrates 101 and 102 are assembled, that is, the ODF (One Drop Fill) process can be utilized. The spread spacers can be replaced by integrated (or photo) spacers to increase the image quality of the display apparatus.

Fourth, attaching the polarizer 119 and 120 to the outside surface of the substrate 101 and 102, and bounding the connections of the outside signal lines.

The polarizer 119 and 120 can be chosen according to desired designs. For example, the linear polarizer, the circular polarizer or the polarizer with compensation film can be utilized as the polarizer 119 or 120. Please note, however, that the polarizer can be omitted in some liquid crystal modes (e.g. Polymer Dispersed Liquid Crystal mode, PDLC).

Figure 1D:
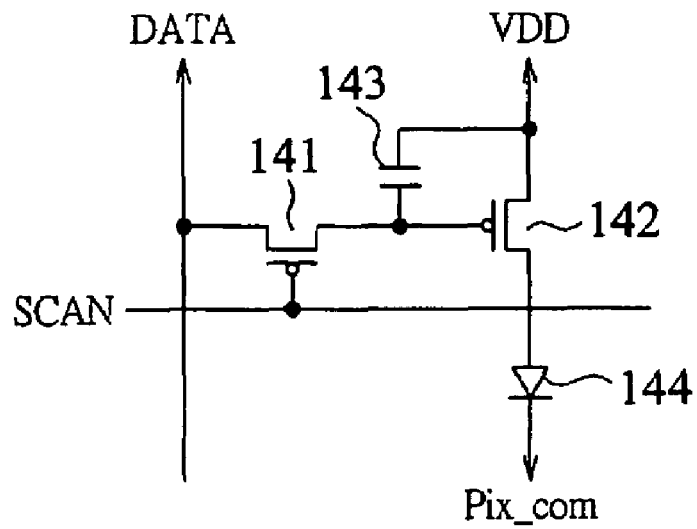
FIG. 1(d) is a unit pixel circuit diagram of the first embodiment according to a display apparatus of the present invention.

FIG. 1(d) is a unit pixel circuit diagram on the substrate 102 of the first embodiment according to the present invention. As shown in FIG. 1(d), the unit pixel circuit includes two thin film transistors (TFT) 141 and 142, a capacitance 143, and an EL device 144 coupled to the TFT 142. The EL device 144 is coupled to a pixel common electrode Pix_com (i.e., reflective electrode 111) and the structure of the circuit shown in FIG. 1(d) is a prior art 2T1C operation circuit. It should be noted that other pixel structures can also be applied to control the EL device. The disclosure of the prior art 2T1C operation circuit is provided by way of example and is not intended as a limitation of the present invention.

Figure 1E:
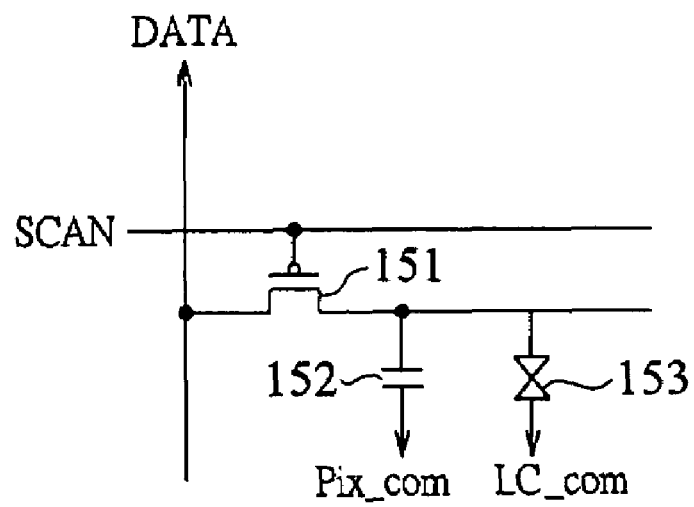
FIG. 1(e) is a unit pixel circuit diagram of the first embodiment according to a display apparatus of the present invention.
Figure 2A:
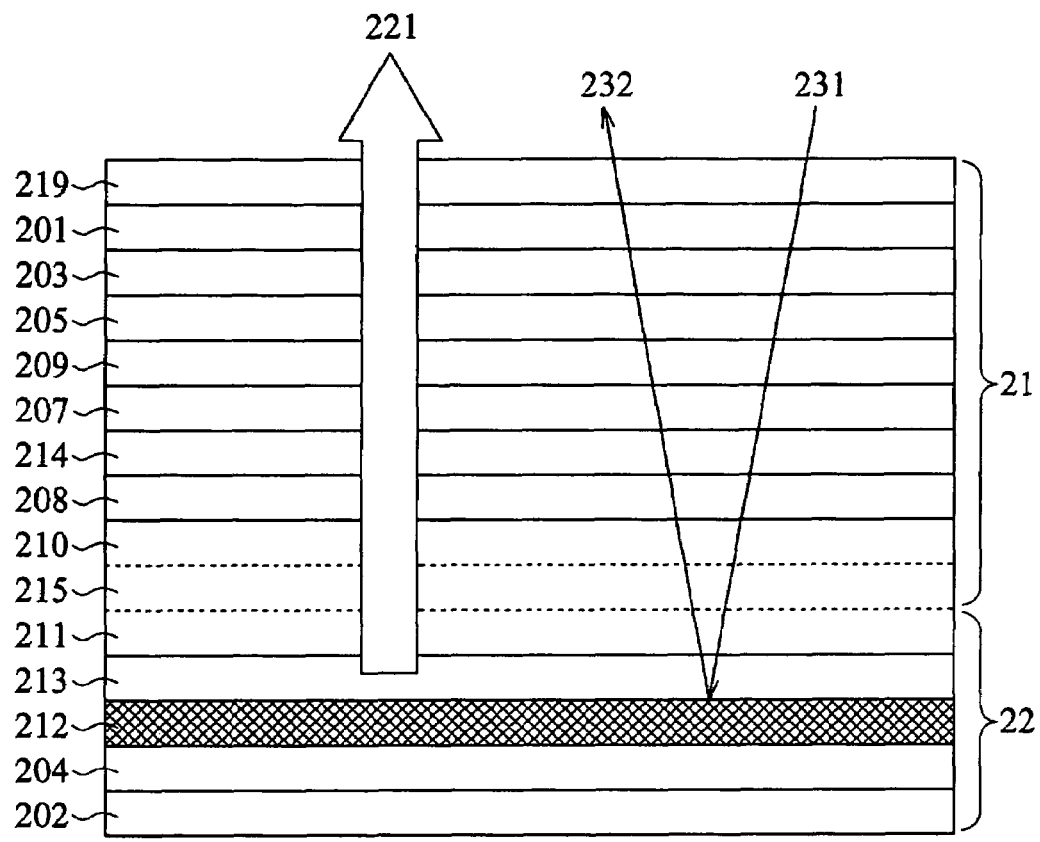
FIG. 2(a) is a schematic diagram illustrating a second embodiment according to a display apparatus of the present invention.
Figure 2B:
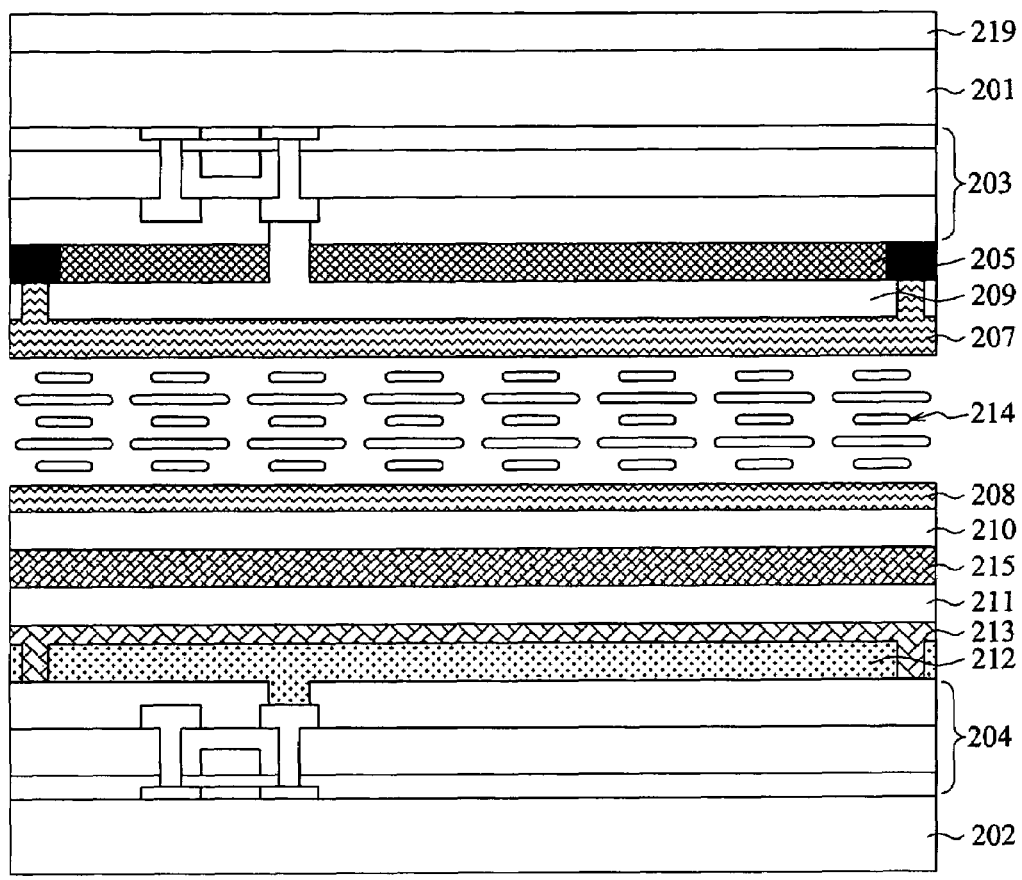
FIG. 2(b) is a cross-section diagram illustrating the second embodiment according to a display apparatus of the present invention.
Figure 2C:
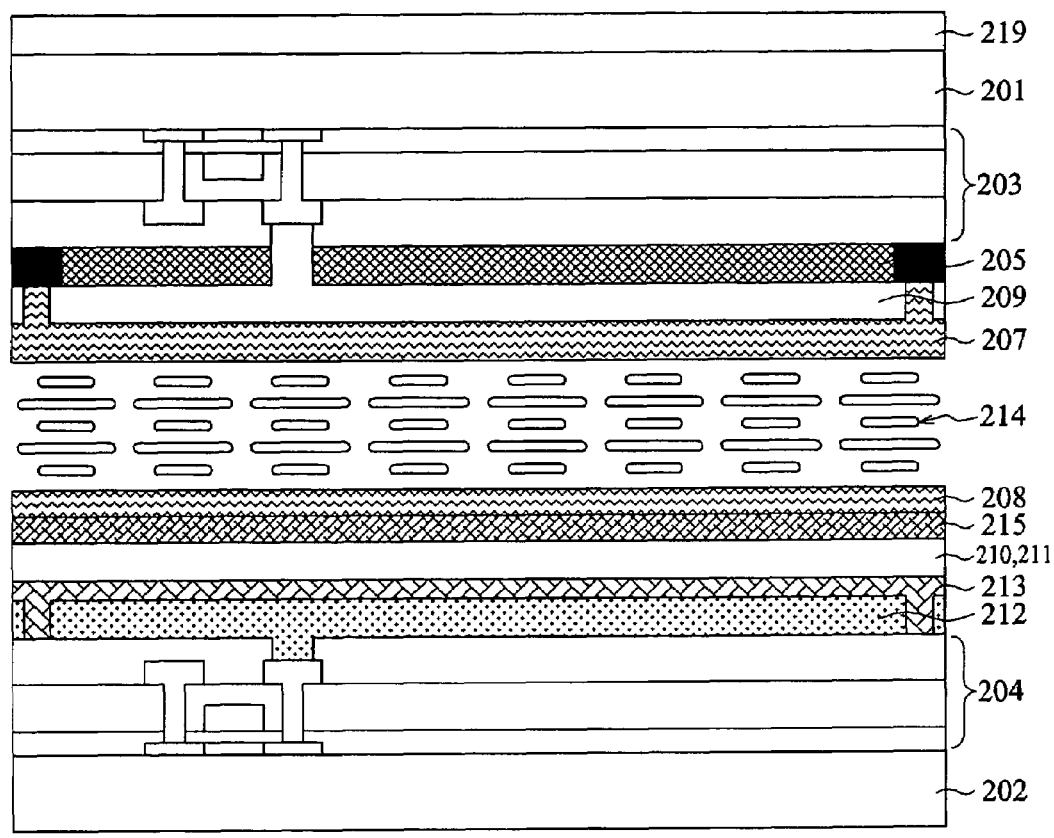
FIG. 2(c) is a cross-section diagram illustrating the second embodiment according to a display apparatus of the present invention.
Figure 2D:
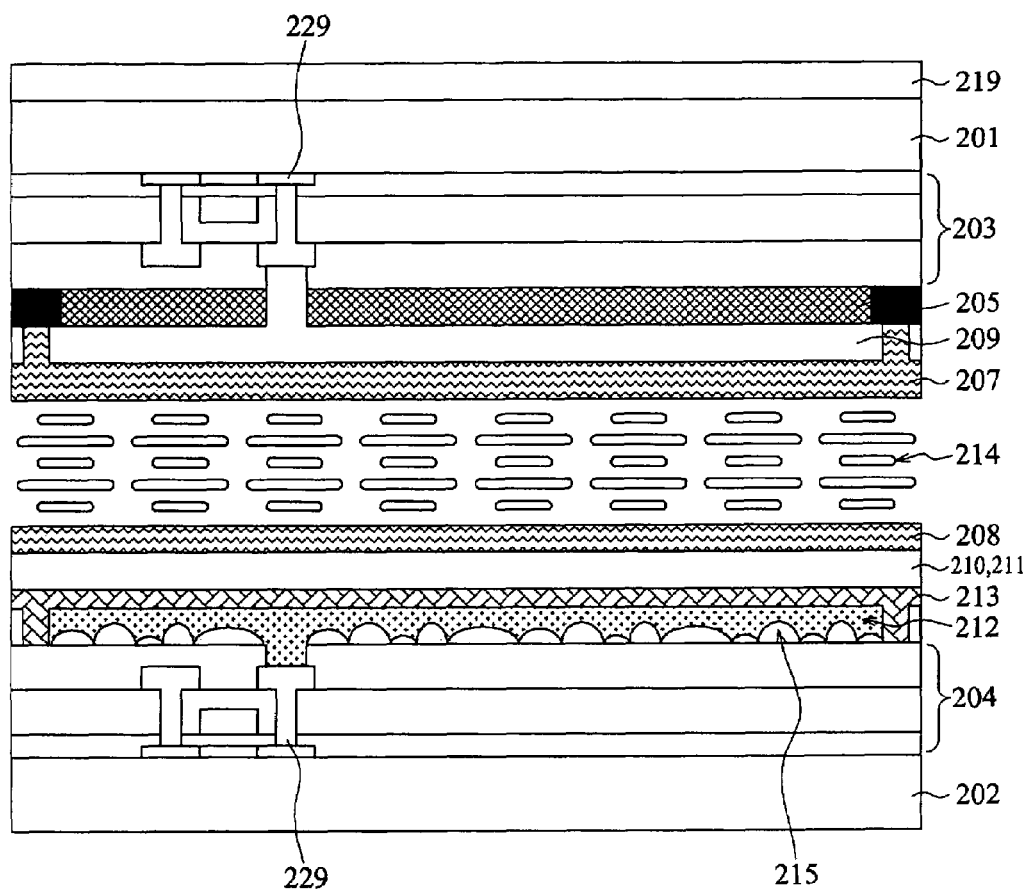
FIG. 2(d) is a cross-section diagram illustrating the second embodiment according to a display apparatus of the present invention.

FIG. 1(e) is a unit pixel circuit diagram on the substrate 101 of the first embodiment according to the present invention. As shown in FIG. 1(e), the unit pixel circuit includes a TFT 151, a capacitance 152, and a liquid crystal device 153. The capacitance 152 is coupled to a pixel common voltage Pix_com, and the structure of the circuit shown in FIG. 1(c) is a prior art 1T1C operation circuit. It should be noted that other pixel circuits can also be applied to control the liquid crystal device. The disclosure of the prior art 1T1C operation circuit is provided by way of example and is not intended as a limitation of the present invention.

It should be noted that, though the EL and the LC are used as the self-luminescent device and the non-self-luminescent device in the aforementioned embodiments, other devices can also be utilized as the self-luminescent device and the non-self-luminescent device and the spirit of the present invention supports said other devices. Additionally, switching devices such as MOS and BJT can replace TFT in aforementioned embodiments. Said replacement also falls within the scope and spirit of the present invention.

A display apparatus according to a second embodiment of the present invention will now be described with reference to FIG. 2(a) to FIG. 2(d). As shown in FIG. 2 (a) and FIG. 2(b), the display apparatus includes a non-self-luminescent display apparatus 21 and self-luminescent display apparatus 22. The display apparatus includes two substrates 201 and 202, wherein a TFT layer 204 and an EL layer 213 are provided on the substrate 202 sequentially. The EL layer 213 is provided (i.e., disposed) between a transparent electrode 211 and a reflective electrode 212 to form a top emissive EL device. The EL layer 213 can emit white light or color light. The substrate 201 includes a TFT layer 203 with a liquid crystal layer 214 provided below. The liquid crystal layer 214 is disposed between the transparent electrode 209 and the transparent electrode 210. A reflective electrode 212 is utilized as a reflective surface such that the structures form a reflective type liquid crystal display apparatus.

The display apparatus functions as an EL display apparatus and a reflective type liquid crystal display apparatus when it is observed from the substrate 201 to the substrate 202. Also, regardless of the ambient environmental light conditions, the electronic signal to the EL device is controlled by the TFT layer 204 on the substrate 202 to thereby control the intensity of the light 221 from the self-luminescent display apparatus, such that an EL display apparatus is formed. Considering the environmental light 231 and the panel together, such that the environmental light 231 flows through the crystal layer 214 and is thereafter reflected by the reflective electrode 212. The reflective electrode 212 is constructed from materials having high reflectivity such as silver or aluminum. The substrate 201 includes a TFT layer 203 as a switch for controlling the transparent electrode 209. Additionally, the state of the liquid crystal layer 214 can be controlled by the voltage difference between the transparent electrode 209 and the transparent electrode 210 such that the intensity of the reflected light 232 is adjusted. Moreover, the EL device and the liquid crystal device can be operated independently to achieve the maximum quality. To improve the display performance, the scattering layer 215 can be utilized. The scattering layer 215 can comprise photoresist with concave or convex surface, which is also called a reflective bump in the conventional reflective type LCD. Also, the same effect can be achieved by distributing tiny particles such as $SiO_x$, $TiO_2$, and MgO in the scattering layer 215. A filter layer 205 can be added according to different designs such that the display apparatus can display monochromatic or color images. Holes can be added to the filter layer 205 by utilizing the prior art liquid crystal display technique such that the reflective type liquid crystal display apparatus or the EL display apparatus can display with higher luminosity.

In this embodiment, since the reflected light 232 and the self-luminescent light 221 both pass through the same filter layer 205, the EL layer 213 can be combined with the filter layer 205 to achieve various display effects. For example, the white light EL and the filter layer 205 are necessary when the EL device and the reflective liquid crystal device are intended for color display. If monochromatic display is desired for the EL device and the reflective liquid crystal device, then the white light EL is necessary and the filter layer 205 can be omitted. Additionally, if the EL device is intended for color display and the reflective liquid crystal only displays black and white, the RGB color EL is utilized but the filter layer 205 can be omitted. If the EL device and the reflective liquid crystal device are desired to display with color and have better self-luminescent displaying, the RGB color EL and the filter layer 205 are necessary.

The alignment layers 207 and 208 are used for controlling the liquid crystal molecule arrangement of the liquid crystal layer 214. The arrangement of the liquid crystal can be homogeneous, homeotropic, twist, or any other arrangements. Since the EL layer 213 is under the alignment layer 208, the preferred alignment layer 208 is a low temperature organic alignment layer formed below 150° C., or an inorganic layer such as $SiO_x$ or DLC film. Moreover, a protection layer can be provided to protect the EL device. The position of the protection layer can be changed for desired purposes and the material of which can be organic or inorganic, such as photoresist, $SiO_x$, $SiN_x$, DLC or the combination of which. Please refer to FIG. 2(*a*). The protection layer can be provided between the reflective electrode 211 and the scattering layer 215. Alternatively, the protection layer can be omitted to decrease the manufacturing cost.

This embodiment can also be amended as shown in FIG. 2(*c*) and FIG. 2(*d*). As shown, the transparent electrode 210 and the transparent electrode 211 can be merged such that the non-self-luminescent display apparatus and the self-luminescent display apparatus can jointly use the transparent electrodes 210 and 211. Additionally, the scattering layer 215 can be moved above the transparent electrodes 210, 211 or below the reflective electrode 212 to achieve an improved image quality. The scattering layer 215 can also be omitted to reduce the manufacturing cost of the display apparatus, but the resulting structure may have a reduced image quality.

The manufacturing process of the display apparatus is similar with that of conventional LCD and is described next in the following steps:

First, sequentially providing the TFT layer 203, the filter layer 205, the transparent electrode 209, and the alignment layer 207 above the substrate 201.

Second, sequentially providing the TFT layer 204, the reflective electrode 212, the EL layer 213, the transparent electrode 211, the scattering layer 215, the transparent electrode 210, and the alignment layer 208 above the substrate 202.

Third, choosing at least one of the substrate 201 or substrate 202 to dispense seal and spread spacers thereon, then assembling the substrates 201 and 202 and filling liquid crystal between the substrates 201 and 202 after they are assembled. Alternatively, the liquid crystal can be dropped before the substrates 201 and 202 are assembled, that is, the ODF process. The spread spacers can be replaced by integrated (or photo) spacers to increase the image quality of the display apparatus. Fourth, attaching the polarizer 219 to the outside surface of the substrate 201, and bounding the connections of the outside signal lines.

The polarizer 219 can be chosen according to desired designs. For example, the linear polarizer, the circular polarizer or the polarizer with compensation film can be utilized as the polarizer 219. Besides, the polarizer can be omitted in some liquid crystal modes.

The unit pixel circuit utilized on the substrate 201 and 202 is the same as the circuit shown in FIG. 1(*d*) and FIG. 1(*e*). Please refer to the FIG. 1(*d*) and FIG. 1(*e*).

Figure 3A:
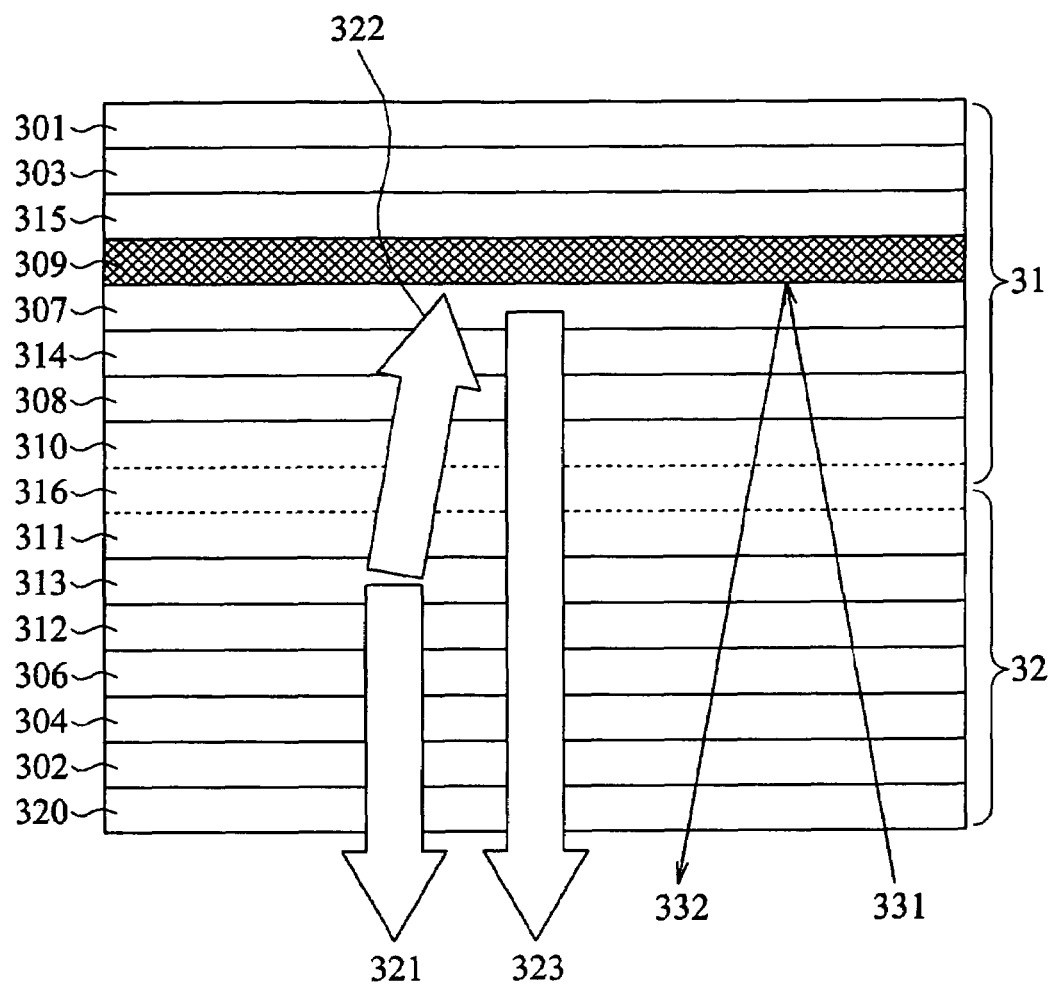
FIG. 3(a) is a schematic diagram illustrating a third embodiment according to a display apparatus of the present invention.
Figure 3B:
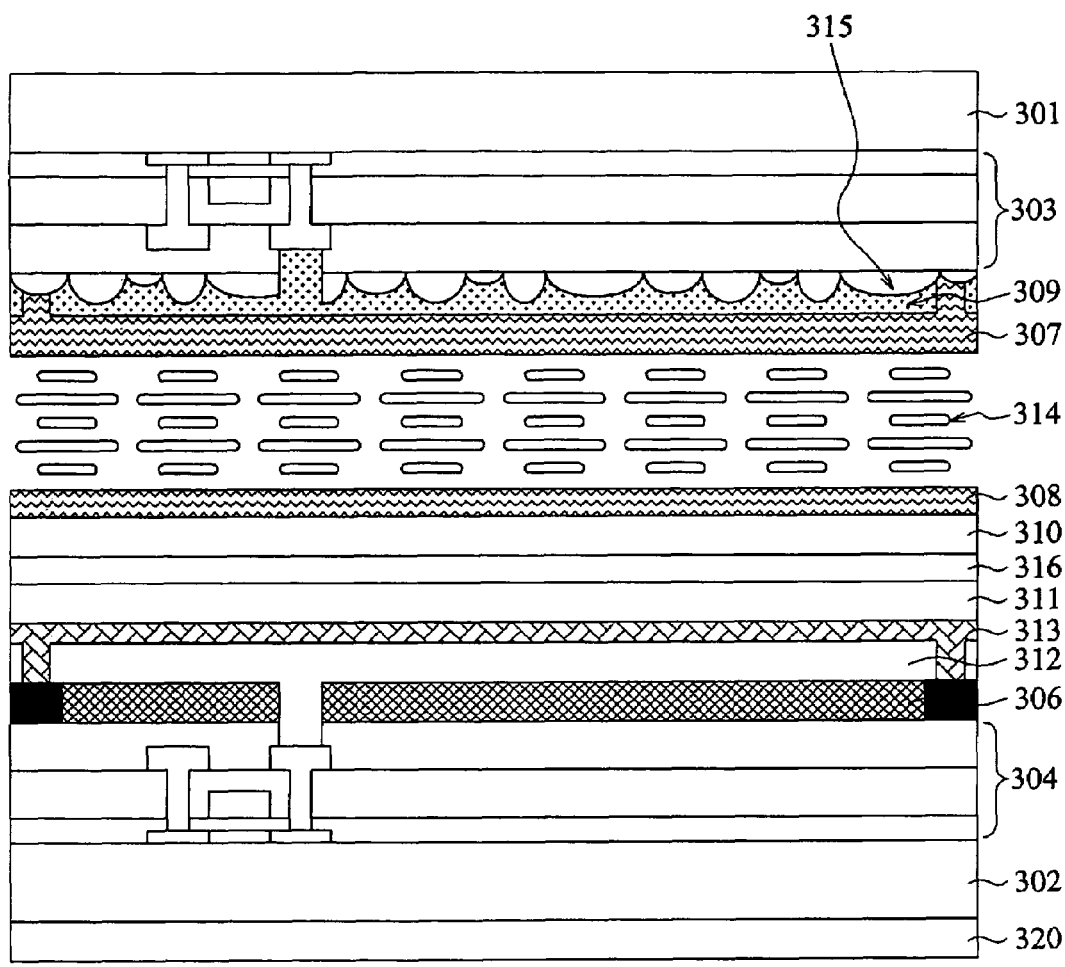
FIG. 3(b) is a cross-section diagram illustrating the third embodiment according to a display apparatus of the present invention.
Figure 3C:
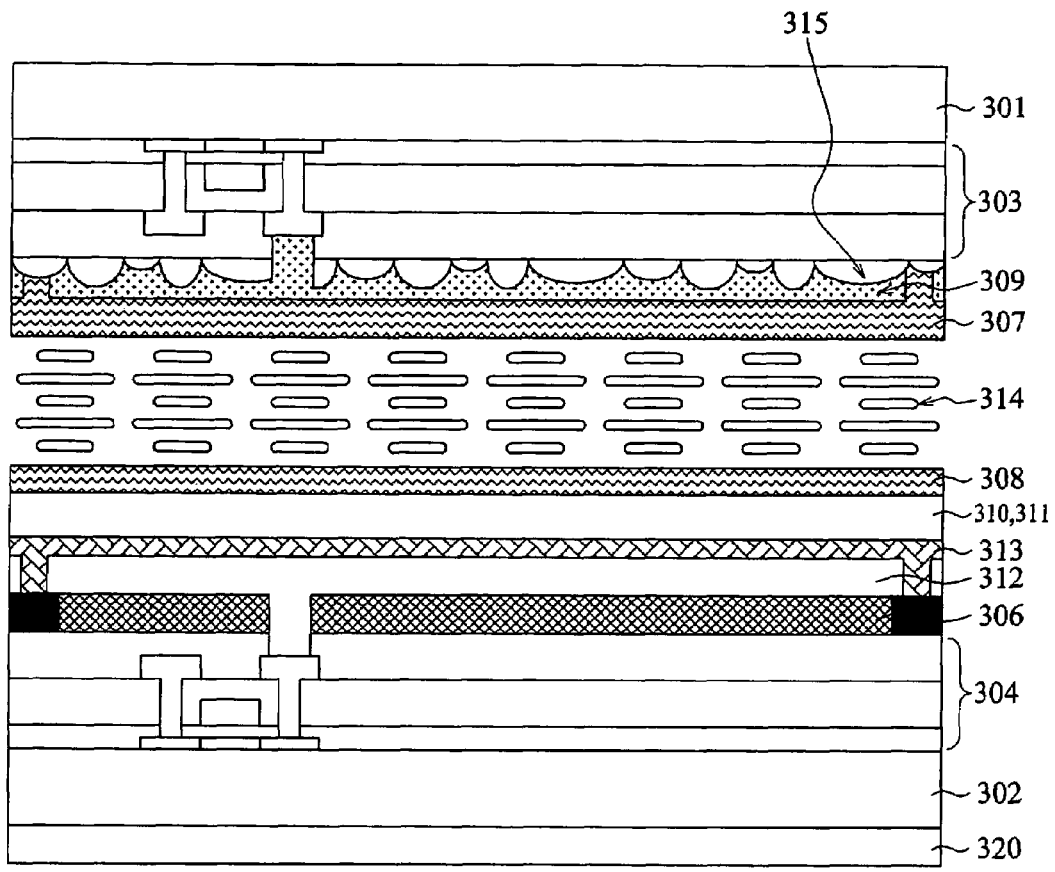
FIG. 3(c) is a cross-section diagram illustrating the third embodiment according to a display apparatus of the present invention.

A display apparatus according to a third embodiment of the present invention will now be described with reference to FIG. 3(*a*) to FIG. 3(*c*). As shown in FIG. 3 (*a*) and FIG. 3(*b*), the display apparatus includes a non-self-luminescent display apparatus 31 and a self-luminescent display apparatus 32. The display apparatus includes two substrates 301 and 302, wherein a TFT layer 304 and an EL layer 313 are provided on the substrate 302 sequentially. The EL layer 313 is provided between a transparent electrode 311 and a transparent electrode 312 to form a dual-sided emissive EL device. In this case, the bottom self-luminescent light 321 goes through the substrate 302 to reach the observer. The top self-luminescent light 322 goes to the substrate 301 and is reflected by the reflective electrode 309 to form the reflected light 323 and then goes through the substrate 302 to reach the observer. The EL layer 313 can emit white light or color light. The substrate 301 includes a TFT layer 303 with a liquid crystal layer 314 provided below. The liquid crystal layer 314 is provided between the reflective electrode 309 and the transparent electrode 310 to form a reflective type liquid crystal display apparatus.

The display apparatus functions as an EL display apparatus and a reflective type liquid crystal display apparatus if it is observed from the substrate 302 to the substrate 301. The electronic signal to the EL device is controlled by the TFT layer 304 on the substrate 302 for modulating the intensity of the light 321 and 322 from the self-luminescent display apparatus, such that an EL display apparatus is formed. If the environment's ambient light is considered, then the environmental light 331 goes to the panel, such that it passes through the liquid crystal layer 314 and is thereafter reflected by the reflective electrode 309. The reflective electrode 309 is made from materials with high reflectivity such as silver or aluminum. The substrate 301 includes a TFT layer 303 to function as a switch for controlling the reflective electrode 309. The state of the liquid crystal layer 314 can be controlled by the voltage difference between the reflective electrode 309 and the transparent electrode 310, thus the intensity of the reflected light 332 can be adjusted. Moreover, the EL device and the liquid crystal device can be operated independently to perform the maximum quality. To improve the display performance, the scattering layer 315 can be utilized. The scattering layer 315 can comprise photoresist with concave or convex surface, which is also called a reflective bump in the conventional reflective type LCD. Also, the same effect can be achieved by distributing tiny particles such as $SiO_x$, $TiO_2$, and MgO in the scattering layer 315. The transparent isolation layer 316 can be organic or inorganic material such as photoresist, $SiO_x$ or $SiN_x$. As shown in FIG. (3c), the transparent isolation layer 316 can be omitted, and the transparent electrode 310, 311 can be merged such that the non-self-luminescent display apparatus and the self-luminescent display apparatus can jointly utilize the transparent electrodes 310 and 311 to reduce the manufacturing cost. The scattering layer 315 can be omitted as well, however, the image quality of the non-self-luminescent display apparatus may decrease. A filter layer 306 can be added according to different designs such that the display apparatus can display monochromatic or color images. Holes can be added to the filter layer 306 by utilizing the prior art liquid crystal display technique such that the reflective type liquid crystal display apparatus or the EL display apparatus can display with higher luminosity.

In this embodiment, since the reflected light 332, the bottom self-luminescent light 321 and the reflected self-luminescent 323 both pass through the same filter layer 306, the EL layer 313 can be combined with the filter layer 306 to achieve various display effects. For example, if the EL device and the reflective liquid crystal device are intended for color display, then the white light EL and the filter layer 306 are necessary. If the EL device and the reflective liquid crystal device are only intended for use with monochromatic display, then the white light EL is necessary and the filter layer 306 can be omitted. Additionally, if the EL device is intended for use with color display and the reflective liquid crystal only displays black and white, then the RGB color EL is utilized but the filter layer 306 can be omitted. Finally, if the EL device and the reflective liquid crystal device are intended for use in displaying color and are required to have a better self-luminescent display, the RGB EL and the filter layer 306 are both necessary.

The alignment layers 307 and 308 are used for controlling the liquid crystal molecule arrangement of the liquid crystal layer 314. The arrangement of the liquid crystal can be a homogeneous, homeotropic, twist, or any other arrangements. Since the EL layer 313 is under the alignment layer 308, the preferred alignment layer 308 is a low temperature organic alignment layer formed below 150° C., or an inorganic layer such as $SiO_x$ or DLC film to avoid damaging the EL layer 313. Moreover, a protection layer can be provided to protect the EL device. The protection layer can be single-layer or multi-layer comprised of organic or inorganic material, such as photoresist, $SiO_x$, $SiN_x$, DLC etc. Please refer to FIG. 3(a). In FIG. 3(a), for example, the protection layer can be provided between the transparent electrode 311 and the transparent isolation layer 316. Alternatively, the protection layer can be omitted to decrease the manufacturing cost.

The manufacturing process of the display apparatus is similar with that of conventional liquid crystal display apparatus and is described next in the following steps:

First, sequentially providing the TFT layer 303, the scattering layer 315, the reflective electrode 309, and the alignment layer 307 above the substrate 301.

Second, sequentially providing the TFT layer 304, the filter layer 306, the transparent electrode 312, the EL layer 313, the transparent electrode 311, the transparent isolation layer 316, the transparent electrode 310 and the alignment layer 308 above the substrate 302.

Third, choosing at least one of the substrate 301 or substrate 302 to dispense seal or spread spacers thereon, then assembling the substrates 301 and 302 and filling liquid crystal between the substrates 301 and 302 after they are assembled. Alternatively, the liquid crystal can be dropped before the substrates 301 and 302 are assembled, that is, the ODF process. The spread spacers can be replaced by integrated (or photo) spacers to increase the image quality of the display apparatus. Fourth, attaching the polarizer 320 to the outside surface of the substrate 302, and bounding the connections of the outside signal lines.

The polarizer 320 can be chosen according to desired designs. For example, the linear polarizer, the circular polarizer, or the polarizer with compensation film can be utilized as the polarizer 320. Besides, the polarizer can be omitted in some particular liquid crystal modes.

The unit pixel circuit utilized on the substrate 301 and 302 is the same as the circuit shown in FIG. 1(d) and FIG. 1(e). Please refer to the FIG. 1(d) and FIG. 1(e).

Figure 4A:
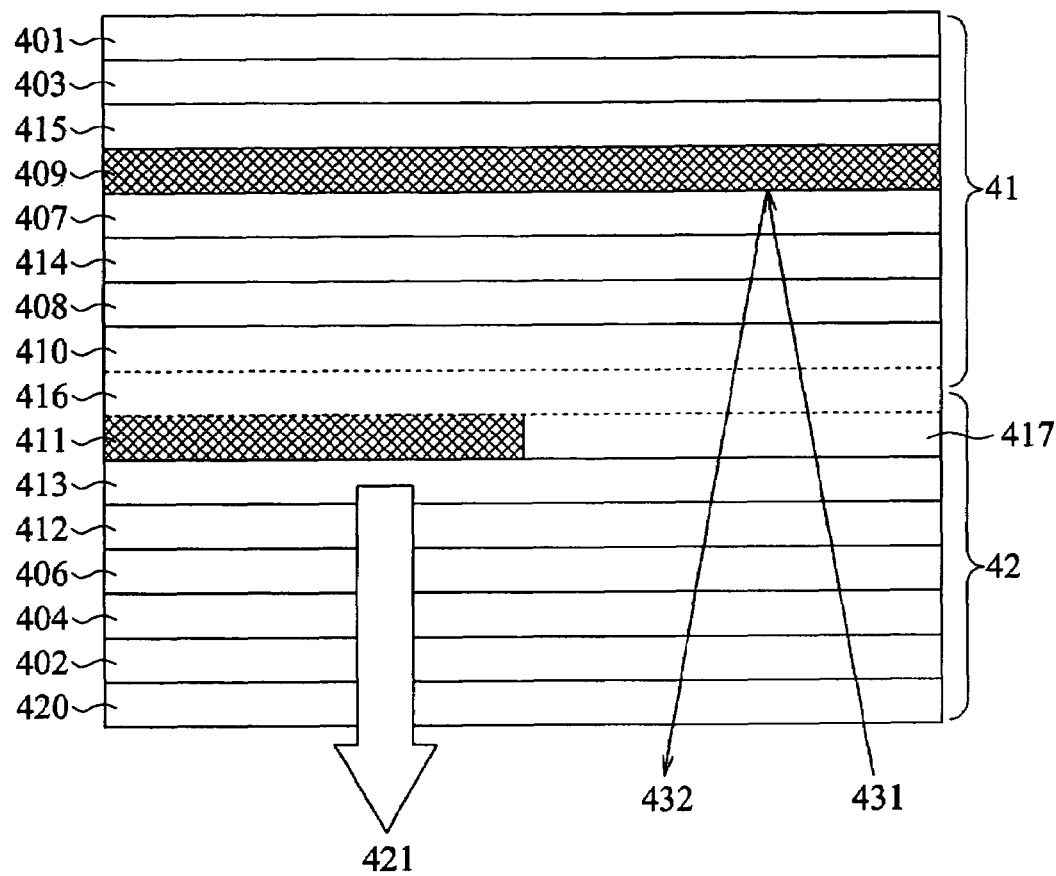
FIG. 4(a) is a schematic diagram illustrating a fourth embodiment according to a display apparatus of the present invention.
Figure 4B:
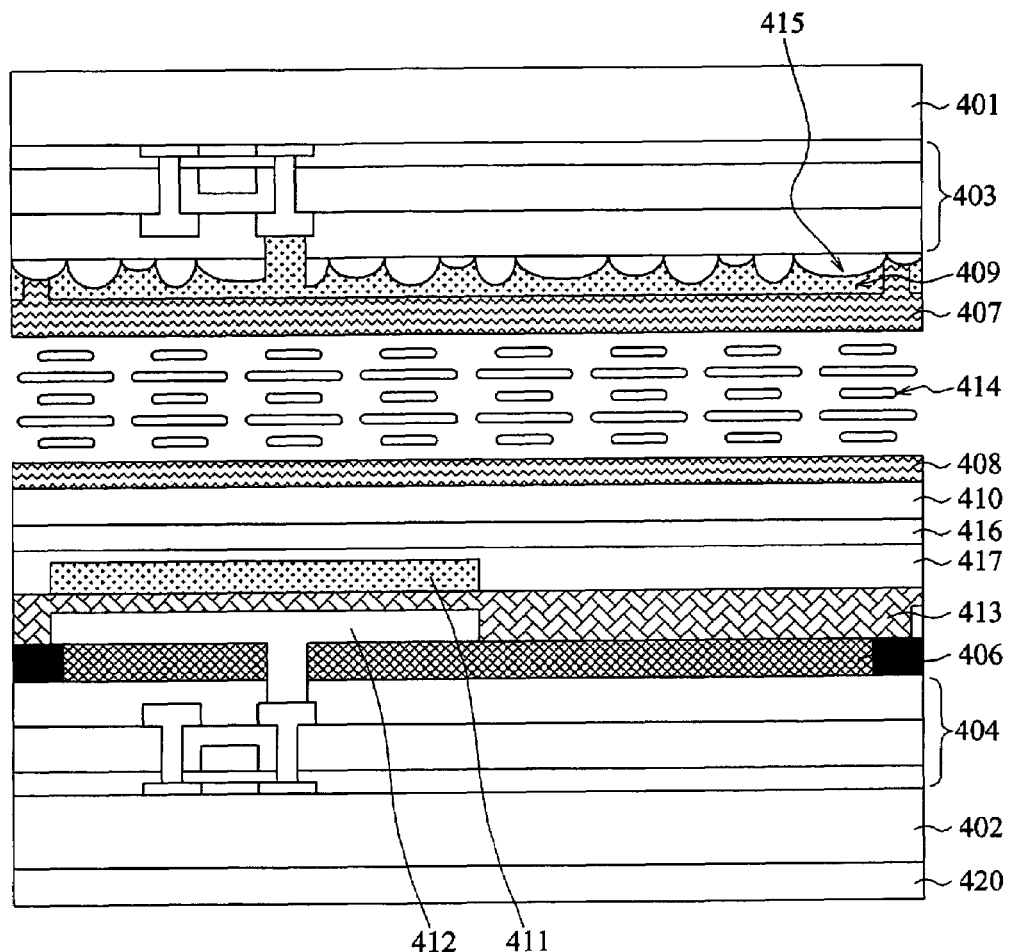
FIG. 4(b) is a cross-section diagram illustrating the fourth embodiment according to a display apparatus of the present invention.

A display apparatus according to a fourth embodiment of the present invention will now be described with reference to FIG. 4(a) to FIG. 4(d). As shown in FIG. 4(a) and FIG. 4(b), the display apparatus includes a non-self-luminescent display apparatus 41 and self-luminescent display apparatus 42. The display apparatus includes two substrates 401 and 402, wherein a TFT layer 404 and an EL layer 413 are provided on the substrate 402 sequentially. The EL layer 413 is disposed between a reflective electrode 411 and a transparent electrode 412 to form a bottom emissive EL device. The EL layer 413 can emit white light or color light. If the RGB color EL is utilized, the EL layer 413 can be patterned by shadow mask evaporation corresponding to the reflective electrode 411. If the white light EL is utilized, the entire face thereof can be evaporated to reduce manufacturing cost. The substrate 401 includes a TFT layer 403 with a liquid crystal layer 414 provided below, wherein the liquid crystal layer 414 is provided between the reflective electrode 409 and the transparent electrode 410 to form a reflective type liquid crystal display apparatus.

The display apparatus functions as an EL display apparatus and a reflective type liquid crystal display apparatus if it is observed from the substrate 402 to the substrate 401. The electronic signal to the EL device is controlled by the TFT layer 404 for modulating the intensity of the self-luminescent light 421, such that an EL display apparatus is formed. The environmental light 431 flows through the liquid crystal layer 414 and thereafter is reflected by the reflective electrode 409. The reflective electrode 409 is constructed from materials with high reflectivity such as silver or aluminum. The substrate 401 includes a TFT layer 403 working as a switch for controlling the reflective electrode 409. The liquid crystal layer 414 can be controlled by the voltage difference between the reflective electrode 409 and the transparent electrode 410 thus the intensity of the reflected light 432 can be adjusted. Moreover, the EL device and the liquid crystal device can be operated independently to perform the maximum quality. To improve the reflective type liquid crystal display apparatus performance, the scattering layer 415 can be utilized. The scattering layer 415 can comprise of photoresist with concave or convex surface, which is also named reflective bump in the conventional reflective type LCD. Also, the same effect can be reached by distributing tiny particles such as $SiO_x$, $TiO_2$, and MgO in the scattering layer 415. The transparent isolation layer 416 can be organic or inorganic material such as photoresist, $SiO_x$ or $SiN_x$. Alternatively, the transparent isolation layer 416 can be omitted and the transparent electrode 410, the transparent electrode 417 and the reflective electrode 411 can be merged such that the non self-luminescent display apparatus and the self-luminescent display device can jointly utilize the merged electrode thereby reducing the manufacturing cost. The scattering layer 415 can be omitted, but the image quality of the non self-luminescent display apparatus may be reduced in this case. The filter layer 406 can be added according to different designs such that the display apparatus can display monochromatic or color images. The arrangement of the filter layer 406 is similar to that of the above-mentioned embodiments. Please refer to the above-mentioned descriptions for details.

The alignment layers 407 and 408 are used for controlling the liquid crystal molecule arrangement of the liquid crystal layer 414. The arrangement of the liquid crystal can be homogeneous, homeotropic, twist, or any other arrangements. Since the EL layer is under the alignment layer 408, the preferred alignment layer 408 is a low temperature organic alignment layer formed below 150° C., or an inorganic layer such as $SiO_x$ or DLC film to avoid damaging the EL layer 413.

Figure 4C:
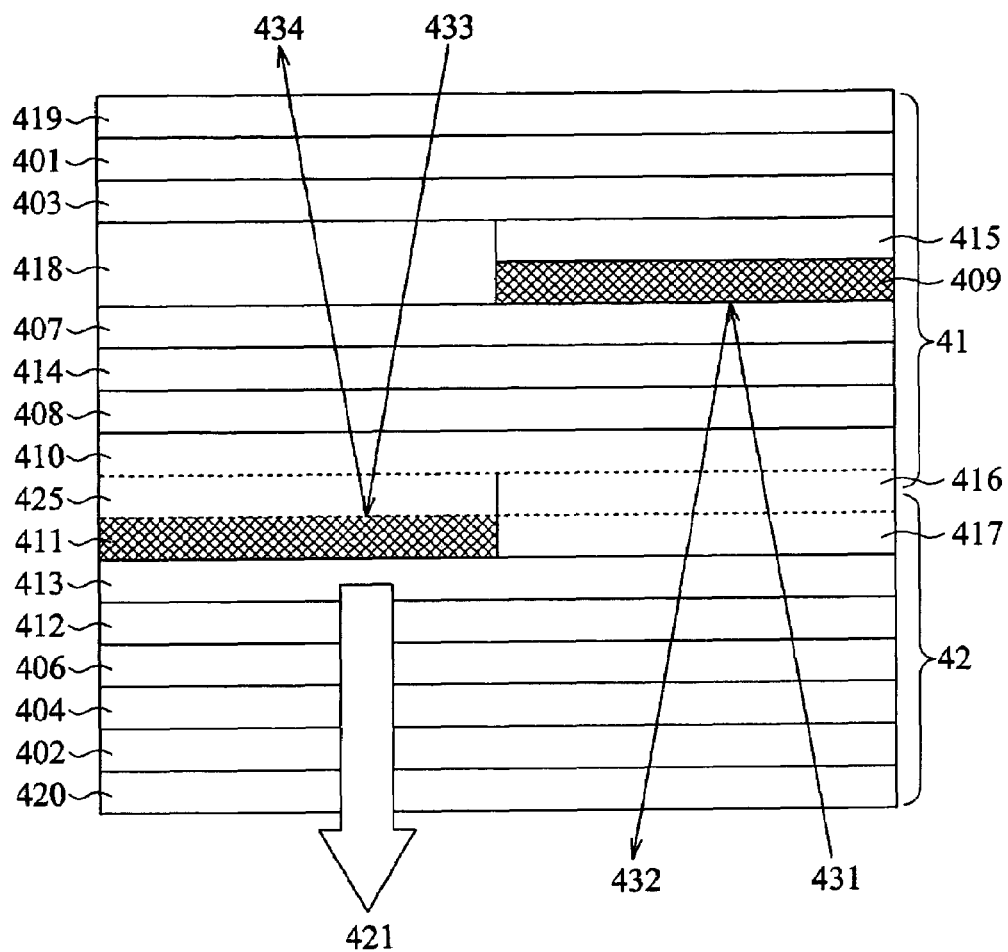
FIG. 4(c) is a schematic diagram illustrating the fourth embodiment according to a display apparatus of the present invention.
Figure 4D:
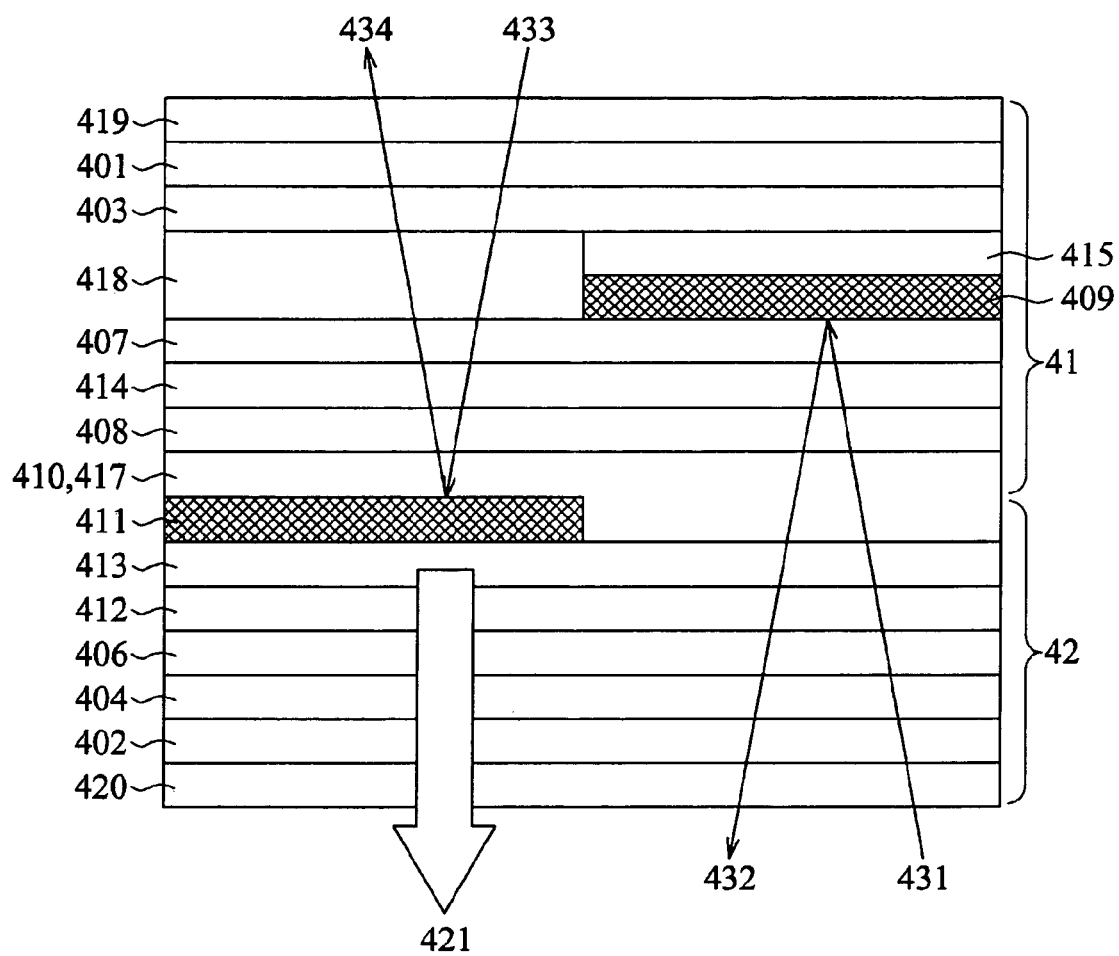
FIG. 4(d) is a schematic diagram illustrating the fourth embodiment according to a display apparatus of the present invention.

Other similar structures of this embodiment are as shown in FIG. 4(c) and FIG. 4 (d). The reflective electrode 409 and the scattering 415 are patterned and a transparent electrode 418 is included. The display apparatus is a reflective type liquid crystal display apparatus if it is observed from the substrate 401 to the substrate 402. The environmental ambient light 433 flows through the liquid crystal layer 414 and is reflected by the reflective electrode 411. The reflective electrode 411 is constructed from material with high reflectivity such as silver or aluminum. The substrate 401 includes a TFT layer 403 working as a switch to control the reflective electrode 409 and transparent electrode 418. The state of the liquid crystal layer 414 can be controlled by the voltage difference between the electrode 409, 418 and the transparent electrode 410 such that the intensity of the reflected light 432 and 434 can be adjusted. Additionally, the display apparatus is a reflective type liquid crystal display apparatus and an EL display apparatus if it is observed from the substrate 402 to the substrate 401. As shown in FIG. 4 (c), a scattering layer 425 can be provided above the patterned reflective electrode 411 to enhance the image quality of the reflective type LCD observed from the substrate 401 to substrate 402. Also, as shown in FIG. 4(d), the scattering layer 425 and the transparent isolation layer 416 can be omitted and the transparent electrode 410, 417 and the reflective electrode 411 can be merged to reduce the manufacturing cost. The polarizer 419 and 420 can be chosen according to desired designs. For example, the linear polarizer, the circular polarizer or the polarizer with compensation film can be utilized. Besides, the polarizer can be omitted in some LC modes. The manufacturing process of the display apparatus is similar to that of the above-mentioned embodiments. Please refer to the above-mentioned descriptions for details. Additionally, the unit pixel circuit utilized on the substrate 401 and 402 is the same as the circuit shown in FIG. 1(d) and FIG. 1(e). Please refer to the FIG. 1(d) and FIG. 1(e) for details.

The common characteristics of the first through fourth embodiment are that the first substrates 101, 201, 301, 401 and the second substrates 102, 202, 302, 402 all include TFT layers and active matrix TFT arrays. The concept of the fifth embodiment is that a passive matrix is used for replacing any one of the active matrix TFT arrays of the first through fourth embodiments to reduce the manufacturing cost. It should be noted that though the isolation layers 316 and 416 are transparent material, it doesn't meant to limit the scope of the present invention. Other material can also be used for isolation layers 316 and 416.

Figure 5A:
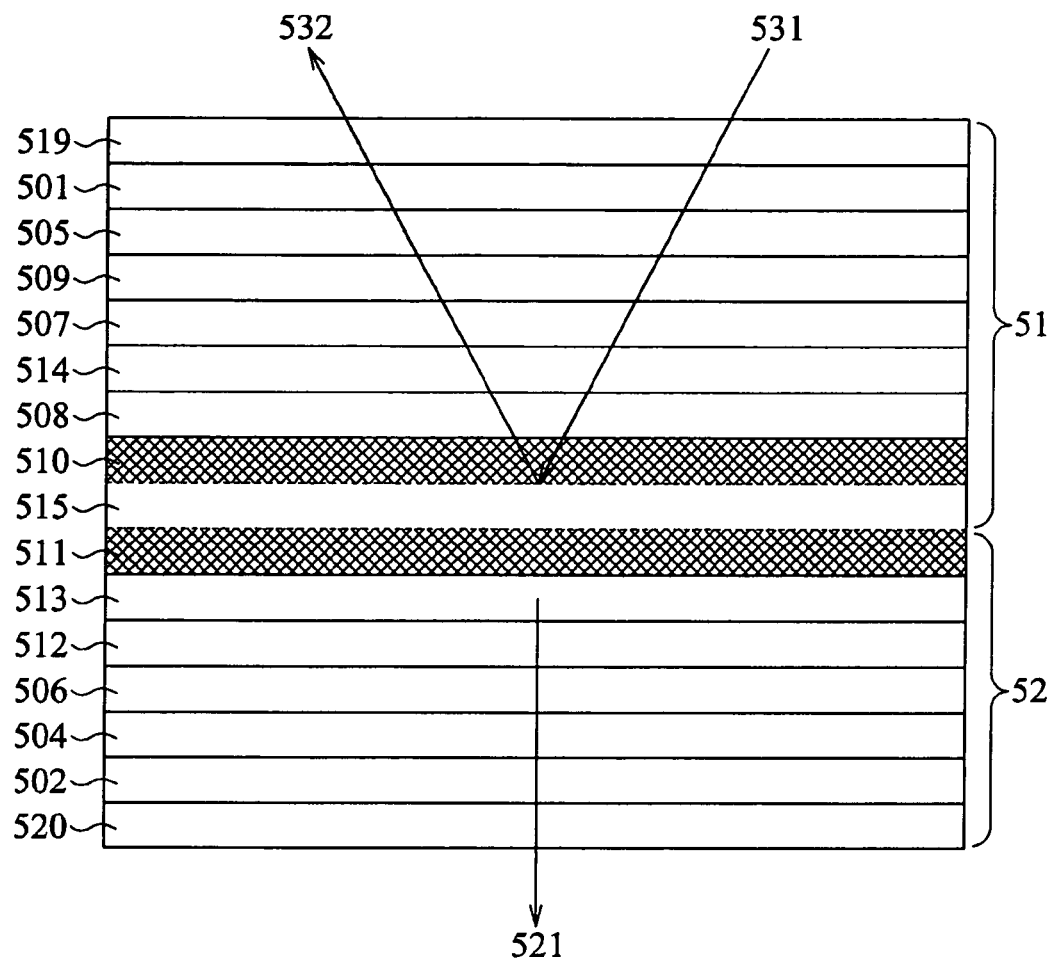
FIG. 5(a) is a schematic diagram illustrating a fifth embodiment according to a display apparatus of the present invention.
Figure 5B:
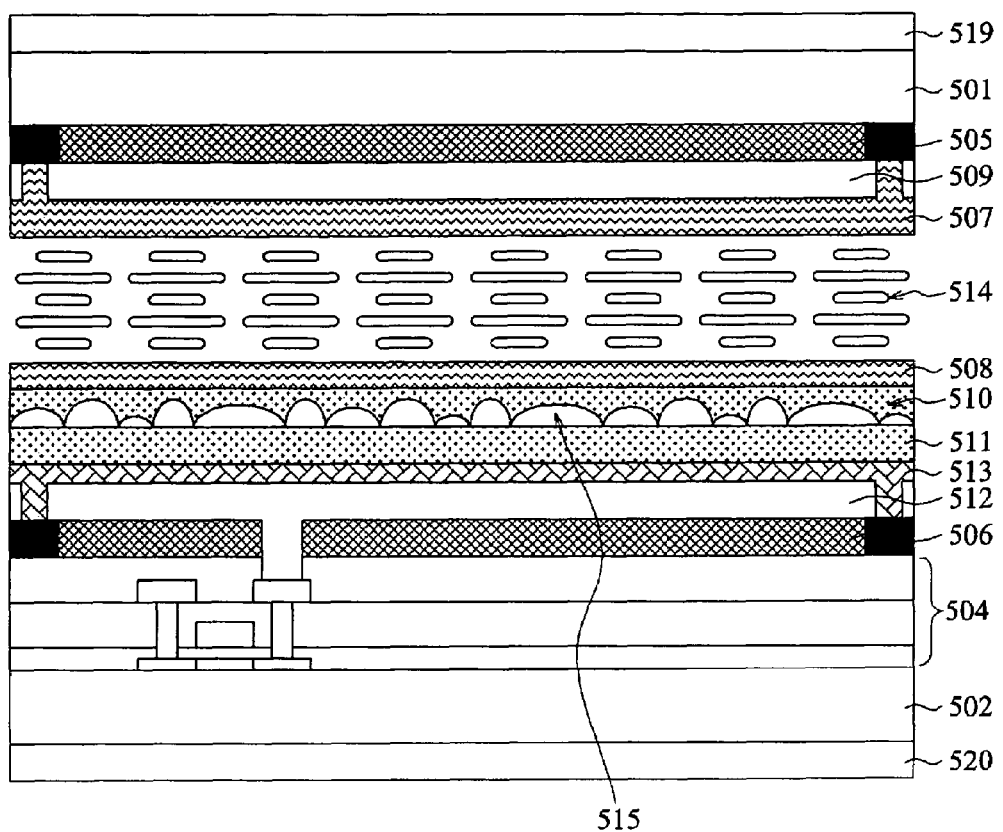
FIG. 5(b) is a cross-section diagram illustrating the fifth embodiment according to a display apparatus of the present invention.

FIG. 5(a) through FIG. 5 (c) are respectively a schematic diagram, a cross section diagram and a unit pixel circuit diagram of the fifth embodiment according to a display apparatus of the present invention. In the fifth embodiment, the TFT layer 103 of the first preferred embodiment is omitted. Please jointly refer to FIG. 5(a) through FIG. 5(c) to clearly understand the technique of the present invention. FIG. 5(a) illustrates the structure that the passive matrix replaces the TFT layer 103 under to the substrate 101 in the first embodiment. In this case, the non-self-luminescent display apparatus 51 is driven passively, and the self-luminescent display apparatus 52 is driven actively. The difference between FIG. 5(b) and FIG. 1(b) is described as follows. FIG. 5(b) does not include a TFT layer below the substrate 501; the transparent electrode 109 in FIG. 1 (b) is patterned to the size of a pixel region, but the transparent electrode 509 in FIG. 5(b) is patterned to form a straight strip electrode; the reflective electrode 110 in FIG. 1(b) is not patterned in FIG. 1 (b), but the reflective electrode 510 in FIG. 5 (b) is patterned to form a transverse strip electrode.

The unit pixel circuit diagram of the single pixel region of the substrate 502 is the same as FIG. 1(d). Please refer to FIG. 1(d) for details.

Figure 5C:
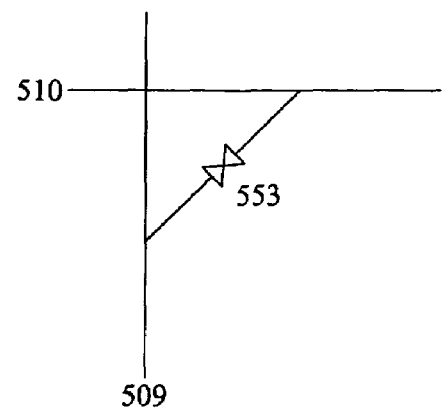
FIG. 5(c) is a unit pixel circuit diagram of the fifth embodiment according to a display apparatus of the present invention.

FIG. 5(c) is a unit pixel circuit diagram according to the fifth embodiment of the present invention. As shown in FIG. 5(c), the unit pixel circuit includes a straight strip electrode 509, a transverse strip electrode 510, and a liquid crystal device 553, which are formed as a prior art passive matrix liquid crystal operation circuits. In this case, super twist nematic liquid crystal can be utilized as the liquid crystal layer 514 to meet the characteristics of passive driving.

Figure 5D:
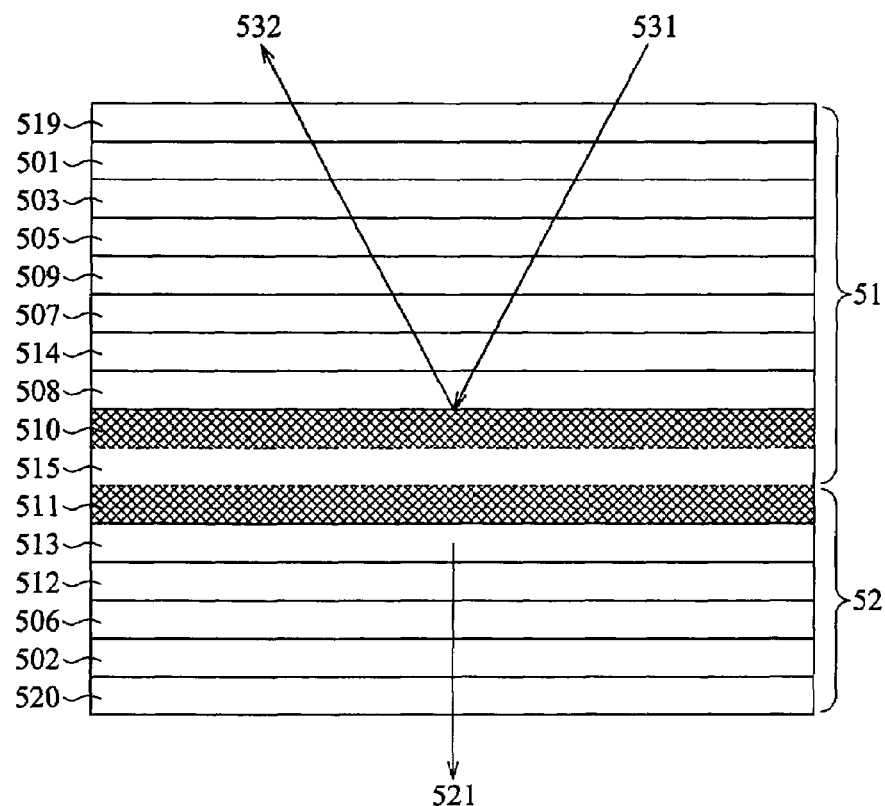
FIG. 5(d) is a schematic diagram illustrating the fifth embodiment according to a display apparatus of the present invention.
Figure 5E:
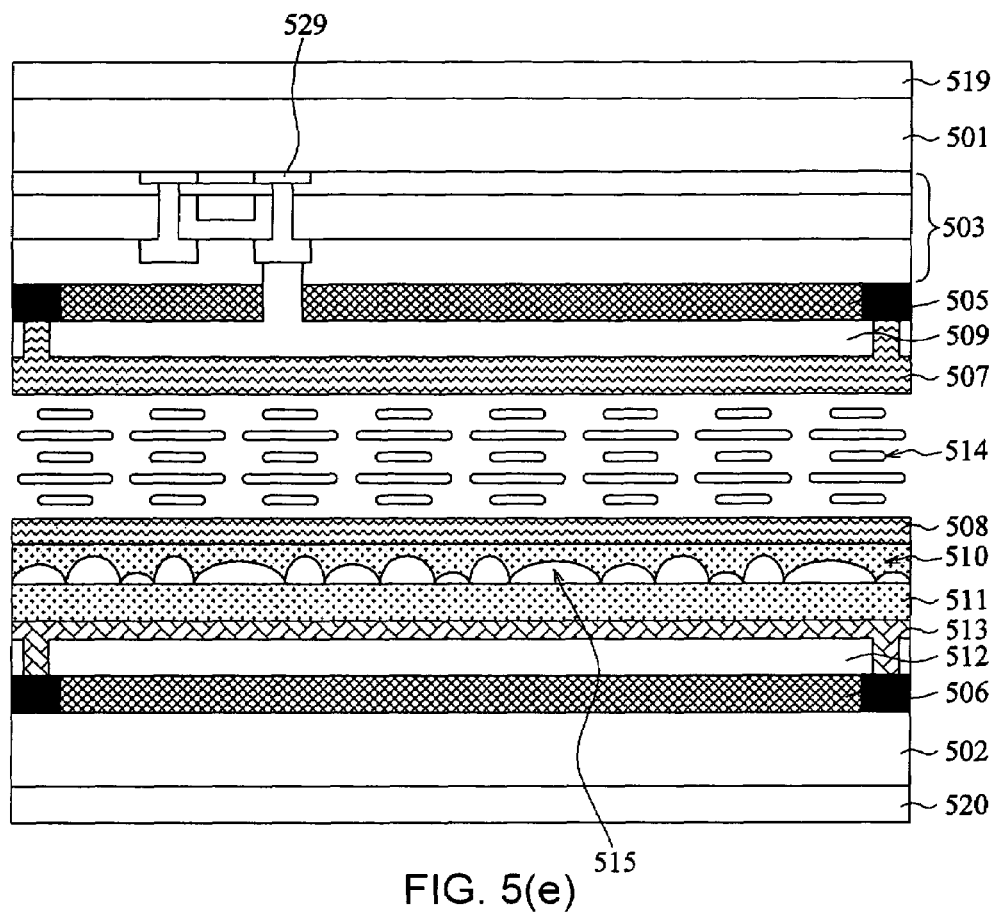
FIG. 5(e) is a cross-section diagram illustrating the fifth embodiment according to a display apparatus of the present invention.
Figure 5F:
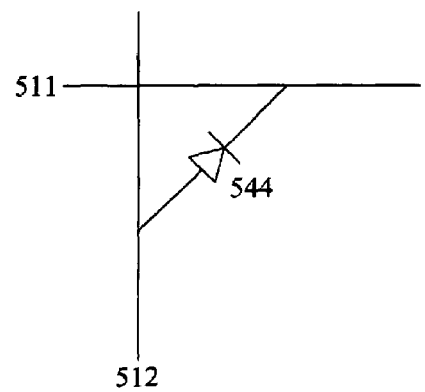
FIG. 5(f) is a unit pixel circuit diagram of the fifth embodiment according to a display apparatus of the present invention.

FIG. 5(d) through FIG. 5(f) are respectively a schematic diagram, a cross section diagram, and a unit pixel circuit diagram according to the fifth embodiment of the present invention. In this embodiment, the TFT layer 104 of the first preferred embodiment is omitted. Please jointly refer to FIG. 5(d) through FIG. 5(f) to clearly understand the technique of the present invention. FIG. 5 (d) illustrates the structure that the passive matrix replaces the TFT layer 104 above the substrate 102 in the first embodiment. In this case, the non-self-luminescent display apparatus 51 is driven actively, and the self-luminescent display apparatus 52 is driven passively. The difference between the FIG. 5 (e) and FIG. 1 (b) is described as follows. FIG. 5(e) does not include a TFT layer above the substrate 502; the transparent electrode 112 in FIG. 1 (b) is patterned to the size of a pixel region, but the transparent electrode 512 in FIG. 5(e) is patterned to form a straight strip electrode; the reflective electrode 111 in FIG. 1(b) is not patterned in FIG. 1 (b), but the reflective electrode in FIG. 5 (e) is patterned to form a transverse strip electrode.

The unit pixel circuit diagram of the single pixel region of the substrate 501 is the same as FIG. 1(*e*). Please refer to FIG. 1(*e*) for details.

FIG. 5(*f*) is a unit pixel circuit diagram according to the fifth embodiment of the present invention. As shown in FIG. 5 (*f*), the unit pixel circuit includes a straight strip electrode 512, a transverse strip electrode 511 and an EL device 544, which are formed as a prior art passive matrix EL operation circuit.

Similar to the first preferred embodiment of the present invention, this embodiment of the present invention can merge reflective electrodes 510 and 511, such that the non-self-luminescent display apparatus and the self-luminescent display apparatus can jointly utilize reflective electrodes 510 and 511. However, the reflective electrode 110 and the reflective electrode 111 are not patterned in the first embodiment, thus the merged electrodes are not patterned in the pixel region. On the contrary, one of the reflective electrode 510 and the reflective electrode 511 is patterned to a straight strip electrode, thus the merged electrodes should be patterned to a straight strip electrode to meet the driving characteristic of the passive devices.

Other characteristics of the fifth embodiment such as material, the combination of the filter layer and the manufacturing process of the display apparatus is similar to the first embodiment, please refer to the description of the first embodiment.

Also, other above-mentioned embodiments can follow the indication disclosed in the fifth embodiment, that is, replacing one of the active matrix TFT arrays with a passive matrix. Please refer to the above-mentioned descriptions for said details.

The non-self-luminescent device can be one of selected from the group consisting of an electrophoresis device, an electrowetting device, an electrochromic device, an electrophase change device, a micro electro mechanical reflection device, and a liquid crystal device.

The present invention also discloses a specially designed substrate to be utilized in a display apparatus with an active driving device and a passive driving device.

Figure 6:
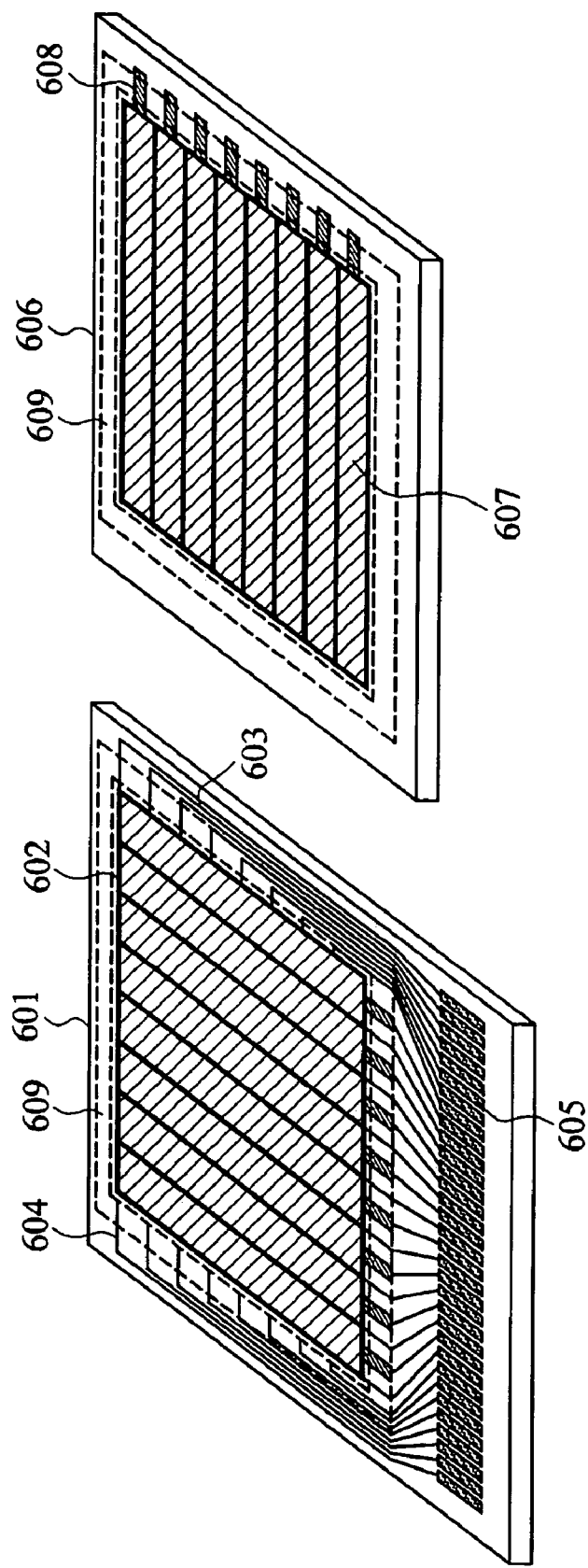
FIG. 6 is a schematic diagram illustrating a substrate layout that can be applied to a display apparatus with an active matrix and a passive matrix according to the present invention.

FIG. 6 is a schematic diagram illustrating a substrate layout that can be applied to a display apparatus with an active matrix and a passive matrix according to the present invention. The first substrate includes: at least one scan line, at least one data line (both are not illustrated), at least one first electrode strips 602, a first connection line region 603, a second connection line region 604, a signal receiving region 605 and a sealing region 609. The second substrate 606 comprises a second electrode strips 607, a protruding portion 608, and a sealing region 609. The first electrode strip 602 covers the scan lines and the data lines, the first connection line region 603 is coupled to the data lines and the signal receiving region 605, and the second connection line region 604 is coupled to the signal receiving region 605. Anisotropic conductive paste can be provided on the sealing region 609 on any one of the substrates. Assembling the first substrate 601 and the second substrate 606 and make the corresponding electrodes of the two substrates conductive. The protruding portion 608 is coupled to the second connection line region 604 to connect the second electrode strip 607 and the second connection line region 604 if the first substrate 601 and the second substrate 606 substantially overlap. It should be noted that although this embodiment connects the second electrode strip 607 and the second connection line region 604 by the protruding portion 608, persons having average skill in the art can easily amend the present embodiment to obtain the same result. Furthermore, these amendments fall within the scope and spirit of the present invention. It should be noted that, the connection lines of the first connection region 603 and the second connection region 604 are respectively coupled to each pin of the signal receiving region 605.

The present embodiment also discloses a substrate layout for the embodiments including two TFT layers, which are disclosed as described below.

As shown in FIG. 7 (*a*) and 7(*b*), the apparatus includes a first substrate 701 and a second substrate 702. The first substrate 701 includes a signal receiving region 703, a first active matrix 704, a first connection line region 705, a second connection line region 706, and a sealing region 709. The scan lines of the first active matrix 704 are coupled to the signal receiving region 703, the first connection line region 705 is coupled to the data lines of the first active matrix 704 (transverse) and the signal receiving region 703, and the second connection line region 706 is coupled to the signal receiving region 703. The second substrate 702 includes a sealing region 709 and a second active matrix 707 with protruding data lines. Anisotropic conductive paste can be provided on the sealing region 709 on any one of the substrates to assemble the first substrate 701 and the second substrate 702 and make the corresponding electrodes of the two substrates conductive. The protruding portion of data lines of the second active matrix 707 (transverse) are coupled to the second connection line region 706, and the scan lines of the second active matrix 707 are coupled to the signal receiving region 703 if the first substrate 701 and the second substrate 702 substantially overlap.

The connection structure disposed between the scan lines of the second active matrix 707 and the signal receiving region 703 can be configured such that the scan lines of the first active matrix 704 and the scan lines of the second active matrix 707 jointly use the connection lines, as shown in FIG. 7 (*a*). Alternatively, the scan lines of the first active matrix 704 and the scan lines of the second active matrix 707 can utilize different connection lines respectively, as shown in FIG. 7 (*b*).

In the seventh embodiment as shown in FIG. 7 (*a*), the scan lines of the first active matrix 704 protrude from the first active matrix 704, and the scan lines of the second active matrix 707 protrude from the second active matrix 707. The protruding portion of the scan lines of the first active matrix 704 are coupled to the protruding portion of the scan lines of the second active matrix 707 and the two protruding portions are jointly coupled to the signal receiving region 703.

Figure 7A:
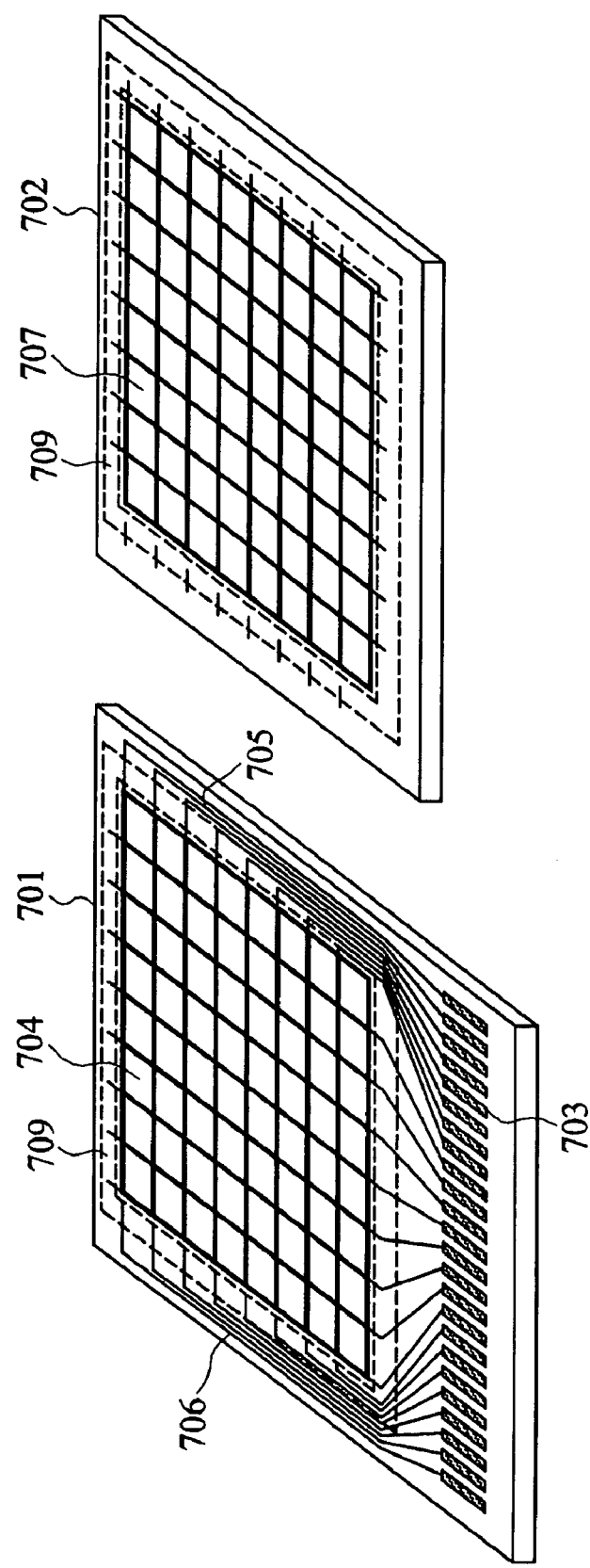
FIG. 7 (a) is a schematic diagram illustrating a substrate layout that can be applied to a display apparatus with two active matrixes.
Figure 7B:
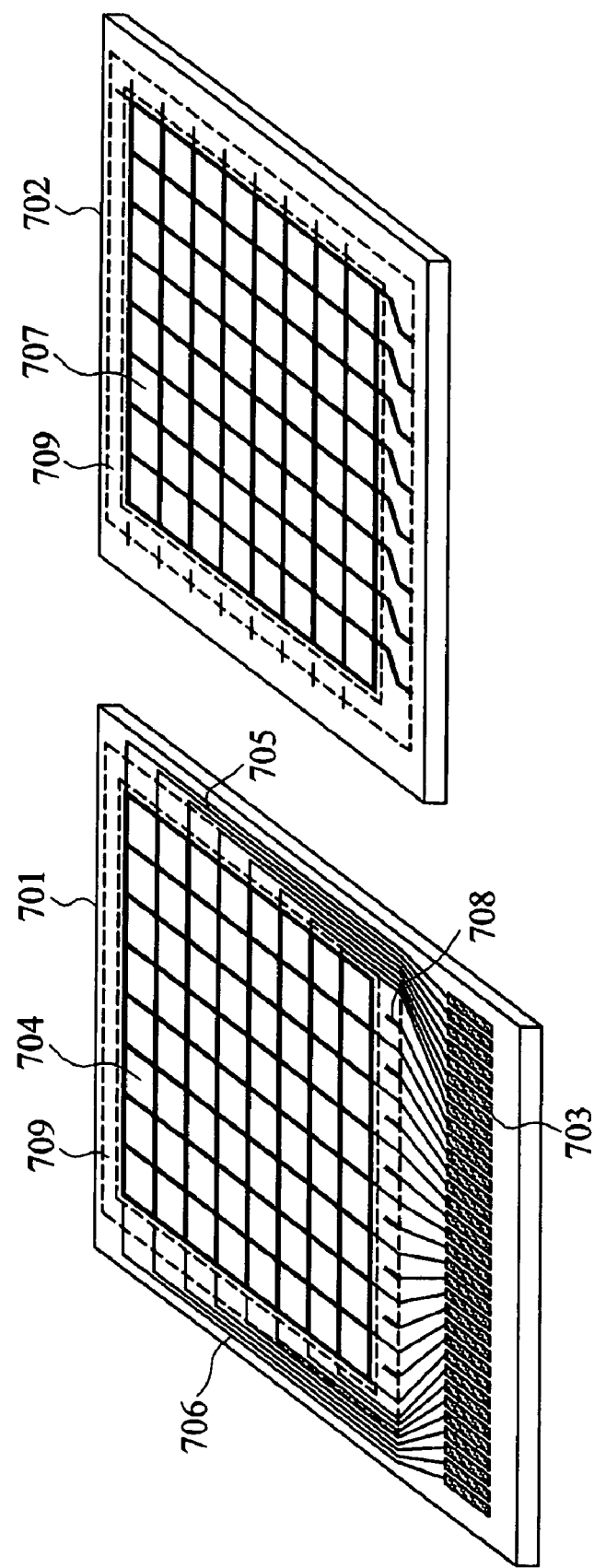

FIG. 7 (*b*) is a schematic diagram illustrating a substrate layout that can be applied to a display apparatus with two active matrixes. In this case, the scan lines of the first active matrix 704 do not protrude the top half part of the first active matrix 704 and the first substrate 701 further includes a third connection line region 708, which is coupled to the signal receiving region 703 and is independent from the scan lines of the first active matrix 704. Additionally, the scan lines of the second active matrix 707 do not protrude the top half portion of the second active matrix 707, and at least a portion of the scan lines protrude the bottom portion of the second active matrix 707. The protruding portion of the scan lines of the second active matrix 707 are coupled to the third connection line region if the first substrate 701 and the second substrate 702 substantially overlap to each other. In this embodiment, different connection lines are utilized as the scan lines of the first active matrix 704 and the second active matrix 707 to be coupled to the signal receiving region 703, as shown in FIG. 7(*b*). It should be noted that, though the protruding portion of the second active matrix 707 is formed in a particular shape, this is offered by way of example and does not limit the scope of the present invention, and persons skilled in the art can easily amend it to obtain the same function. It should be noted that, in FIG. 7(a) and FIG. 7(b), the conductive lines of the first connection line region 705 and the second connection line region 706 are independent and are coupled to each pin of the signal receiving region 703, respectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display apparatus with a self-luminescent device and a non-self-luminescent device, comprising:
   a first substrate;
   a second substrate; and
   a pixel matrix with a plurality of pixels, wherein each pixel comprises:
   a first switching device;
   a non-self-luminescent device, controlled by the first switching device;
   a second switching device;
   a self-luminescent device, controlled by the second switching device;
   wherein the first switching device and the second switching device are active devices, and the first switching device is disposed on the first substrate, and the second switching device is disposed on the second substrate.

2. The display apparatus of claim 1, wherein the first and the second switching devices are thin film transistors.

3. The display apparatus of claim 1, wherein the self-luminescent device is an electroluminescent device comprising a first electrode layer, a second electrode layer, and an electroluminescent layer between the first electrode layer and the second electrode layer.

4. The display apparatus of claim 3, wherein the non-self-luminescent device is at least one member selected from the group consisting of an electrophoresis device, an electrowetting device, an electrochromic device, an electro-phase change device, a micro electro mechanical reflection device, and a liquid crystal device.

5. The display apparatus of claim 4, wherein the non-self-luminescent device is a liquid crystal device comprising a third electrode layer, a fourth electrode layer, and a liquid crystal layer between the third electrode layer and the fourth electrode layer, a first alignment layer between the third electrode layer and the liquid crystal layer, and a second alignment layer between the fourth electrode layer and the liquid crystal layer.

6. The display apparatus of claim 5, wherein the electroluminescent layer is between the first electrode layer and the second electrode layer, the liquid crystal layer is between the third electrode layer and the fourth electrode layer, and the second electrode layer is near the third electrode layer.

7. The display apparatus of claim 6, wherein an isolation layer is disposed between the second electrode layer and the third electrode layer.

8. The display apparatus of claim 7, wherein the isolation layer is a non-flat structure with a convex surface or a concave surface.

9. The display apparatus of claim 5, wherein the first electrode layer and the fourth electrode layer are transparent material, and the second electrode layer and the third electrode layer are high reflectivity material.

10. The display apparatus of claim 5, wherein the first electrode layer is high reflectivity material, and the second electrode layer, the third electrode layer, and the fourth electrode layers are transparent material.

11. The display apparatus of claim 5, wherein the first electrode layer, the second electrode layer, and the third electrode layer are transparent material, and the fourth electrode layer is a high reflectivity material.

12. The display apparatus of claim 5, wherein the first electrode layer and the third electrode layer are transparent material, the fourth electrode layer is high reflectivity material, and the second electrode layer comprises both transparent material and high reflectivity material.

13. The display apparatus of claim 5, wherein the first electrode layer and third electrode layer are transparent material, and the second electrode layer and the fourth electrode layer comprise both transparent material and high reflectivity material.

14. The display apparatus of claim 13, wherein an isolation layer is disposed between the second electrode layer and the third electrode layer.

15. The display apparatus of claim 14, wherein the isolation layer disposed between the second electrode layer and the third electrode layer further comprises a transparent portion and a scattering portion.

16. The display apparatus of claim 6, wherein the second electrode layer and the third electrode layer are merged into a fifth electrode layer, such that the EL layer is between the first electrode layer and the fifth electrode layer, and the LC layer is between the fifth electrode layer and the fourth electrode layer.

17. The display apparatus of claim 16, wherein the first electrode layer and the fourth electrode layer are transparent material, and the fifth electrode layer is a high reflectivity material.

18. The display apparatus of claim 16, wherein the first electrode layer is high reflectivity material, and the fourth electrode layer and the fifth electrode layer are transparent material.

19. The display apparatus of claim 16, wherein the first electrode layer and the fifth electrode layer are transparent material, and the fourth electrode layer is a high reflectivity material.

20. The display apparatus of claim 16, wherein the first electrode layer is transparent material, the fourth electrode layer is high reflectivity material, and the fifth electrode layer comprises both transparent material and high reflectivity material.

21. The display apparatus of claim 16, wherein the first electrode layer is transparent material, and the fifth electrode layer and the fourth electrode layer comprise both transparent material and high reflectivity material.

22. The display apparatus of claim 1, wherein the non-self-luminescent device is at least one selected from the group consisting of an electrophoresis device, an electrowetting device, an electrochromic device, an electro-phase change device, a micro electro mechanical reflection device, and a liquid crystal device.

23. The display apparatus of claim 22, wherein the non-self-luminescent device comprising a third electrode layer, a fourth electrode layer, and a liquid crystal layer between the third electrode layer and the fourth electrode layer, a first alignment layer disposed between the third electrode layer and the liquid crystal layer, and a second alignment layer disposed between the fourth electrode layer and the liquid crystal layer.

24. The display apparatus of claim 7, further comprising a scattering layer disposed between the second electrode layer and the third electrode layer.

25. The display apparatus of claim 1, wherein one of the first substrate and the second substrate comprises: a first active matrix, a first connection line region, a second connection line region, and a signal receiving region; the other of the first substrate and second substrate comprises a second active matrix the first connection line region is coupled to the data lines of the first active matrix and the signal receiving region, and the second connection line region is coupled to the signal receiving region;

the data lines of the second active matrix protrude from the second active matrix, the protruding portion of the data lines of the second active matrix are coupled to the second connection line region, the scan lines of the first active matrix are coupled to the signal receiving region and the scan lines of the second active matrix are coupled to the signal receiving region if the first substrate and the second substrate substantially overlaps to each other.

26. The display apparatus of claim 25, wherein the scan lines of the first active matrix protrude from the first active matrix, and the scan lines of the second active matrix protrude from the second active matrix, wherein the protruding portion of the scan lines of the first active matrix and the protruding portion of the scan lines of the second active matrix are jointly coupled to the signal receiving region.

27. The display apparatus of the claim 25, wherein the substrate having the first active matrix further includes a third connection line region, which is coupled to the signal receiving region and is independent from the scan lines of the first active matrix;

wherein at least a portion of the scan lines of the second active matrix protrude from the second active matrix, and the protruding portion of the scan lines of the second active matrix are coupled to the third connection line region.

28. The display apparatus of the claim 25, wherein the first and second substrates further comprises a sealing region comprising anisotropic conductive paste.

29. A display apparatus with a self-luminescent device and a non-self-luminescent device, comprising:

a first substrate;

a second substrate; and a pixel matrix with a plurality of pixels, wherein each of the pixels comprises: a first switching device;

a non-self-luminescent device, controlled by the first witching device;

a second switching device;

a self-luminescent device, controlled by the second witching device;

wherein one of the first switching device and the second switching device is a passive device and the other one is an active device, wherein the first switching device is disposed on the first substrate, and the second switching device is disposed on the second substrate.

30. The display apparatus of claim 29, wherein the active device is a thin film transistor.

31. The display apparatus of claim 29, wherein the self-luminescent device is an electroluminescent device comprising a first electrode layer, a second electrode layer and an EL layer between the first electrode layer and the second electrode layer.

32. The display apparatus of claim 31, the non-self-luminescent device is at least one selected from the group consisting of an electrophoresis device, an electrowetting device, an electrochromic device, an electro-phase change device, a micro electro mechanical reflection device, and a liquid crystal device.

33. The display apparatus of claim 32, the non self-luminescent device is a liquid crystal device comprising a third electrode layer, a fourth electrode layer and an LC layer between the third electrode layer and the fourth electrode layer, a first alignment layer between the third electrode layer and the LC layer, and a second alignment layer between the fourth electrode layer and the LC layer.

34. The display apparatus of claim 33, wherein the EL layer is disposed between the first electrode layer and the second electrode layer, the LC layer is disposed between the third electrode layer and the fourth electrode layer, and the second electrode layer is near the third electrode layer.

35. The display apparatus of claim 34, wherein there is an isolation layer disposed between the second electrode layer and the third electrode layer.

36. The display apparatus of claim 35, wherein the isolation layer is a non-flat structure with a convex surface or a concave surface.

37. The display apparatus of claim 33, wherein the first electrode layer and the fourth electrode layer are transparent material, and the second electrode layer and the third electrode layer are high reflectivity material.

38. The display apparatus of claim 33, wherein the first electrode layer is high reflectivity material, and the second electrode layer, the third electrode layer and the fourth electrode layer are transparent material.

39. The display apparatus of claim 33, wherein the first electrode layer, the second electrode layer, the third electrode layer are transparent material, and the fourth electrode layer is a high reflectivity material.

40. The display apparatus of claim 33, the first electrode layer and the third electrode layer are transparent material, the fourth electrode layer is high reflectivity material, and the second electrode layer comprises both transparent material and high reflectivity material.

41. The display apparatus of claim 33, wherein the first electrode layer and third electrode layer are transparent material, and the second electrode layer and the fourth electrode layer comprise both transparent material and high reflectivity material.

42. The display apparatus of claim 41, wherein an isolation layer is disposed between the second electrode layer and the third electrode layer.

43. The display apparatus of claim 42, wherein the isolation layer disposed between the second electrode layer and the third electrode layer further comprises a transparent portion and a scattering portion.

44. The display apparatus of claim 34, wherein the second electrode layer and the third electrode layer are merged to a fifth electrode layer, wherein the EL layer is disposed between the first electrode layer and the fifth electrode layer, and the LC layer is disposed between the fifth electrode layer and the fourth electrode layer.

45. The display apparatus of claim 44, wherein the first electrode layer and the fourth electrode layer are transparent material, and the fifth electrode layer is a high reflectivity material.

46. The display apparatus of claim 44, wherein the first electrode layer is high reflectivity material, and the fourth electrode layer and the fifth electrode layer are transparent material.

47. The display apparatus of claim 44, wherein the first electrode layer and the fifth electrode layer are transparent material, and the fourth electrode layer is high reflectivity material.

48. The display apparatus of claim 44, wherein the first electrode layer is transparent material, the fourth electrode layer is high reflectivity material, and the fifth electrode layer comprises both transparent material and high reflectivity material.

49. The display apparatus of claim 44, wherein the first electrode layer is transparent material, and the fifth electrode layer and the fourth electrode layer comprise both transparent material and high reflectivity material.

50. The display apparatus of claim 29, the non-self-luminescent device is at least one selected from the group consisting of an electrophoresis device, an electrowetting device, an electrochromic device, an electro-phase change device, a micro electro mechanical reflection device, and a liquid crystal device.

51. The display apparatus of claim 50, the non-self-luminescent device is the liquid crystal device comprising a third electrode layer, a fourth electrode layer and a LC layer between the third electrode layer and the fourth electrode layer, a first alignment layer between the third electrode layer and the LC layer, and a second alignment layer between the fourth electrode layer and the LC layer.

52. The display apparatus of claim 35, further comprise a scattering layer between the second electrode layer and the third electrode layer.

53. The apparatus of claim 29, wherein one of the first substrate and second substrate has an active matrix comprising at least one scan line and at least one data line, where the same one of the first substrate and second substrate further comprises at least one first electrode bar, a first connection line region, a second connection line region, and a signal receiving region;

the other one of the first substrate and second substrate comprises at least one second electrode bars, wherein the at least one first electrode bar cover the scan lines and the data lines, the first connection line region is coupled to the data lines and the signal receiving region, where the second connection line region is coupled to the signal receiving region and the signal receiving region coupled to the scan lines and the first electrode bar; and the second electrode bar is coupled to the second connection line region if the first substrate substantially overlaps the second substrate.

54. The display apparatus of the claim 53, wherein the first and second substrates further comprises a sealing region comprising anisotropic conductive paste.

* * * * *